US010339701B2

(12) United States Patent
Peterson et al.

(10) Patent No.: US 10,339,701 B2
(45) Date of Patent: Jul. 2, 2019

(54) METHOD, SYSTEM AND APPARATUS FOR GENERATION AND PLAYBACK OF VIRTUAL REALITY MULTIMEDIA

(71) Applicant: PCP VR INC., Toronto (CA)

(72) Inventors: Erik Peterson, Toronto (CA); Aria Shahingohar, Toronto (CA)

(73) Assignee: PCP VR INC., Toronto (CA)

( * ) Notice: Subject to any disclaimer, the term of this patent is extended or adjusted under 35 U.S.C. 154(b) by 0 days.

(21) Appl. No.: 15/310,927

(22) PCT Filed: May 13, 2015

(86) PCT No.: PCT/CA2015/000306
§ 371 (c)(1),
(2) Date: Nov. 14, 2016

(87) PCT Pub. No.: WO2015/172227
PCT Pub. Date: Nov. 19, 2015

(65) Prior Publication Data
US 2017/0094262 A1 Mar. 30, 2017

Related U.S. Application Data

(60) Provisional application No. 61/992,488, filed on May 13, 2014.

(51) Int. Cl.
*G06T 1/60* (2006.01)
*G06T 15/00* (2011.01)
(Continued)

(52) U.S. Cl.
CPC ............. *G06T 15/205* (2013.01); *G06T 1/60* (2013.01); *G06T 15/00* (2013.01); *G06T 19/006* (2013.01);
(Continued)

(58) Field of Classification Search
None
See application file for complete search history.

(56) References Cited

U.S. PATENT DOCUMENTS 9,208,571 B2 * 12/2015 Evertt .................. H04N 5/2226
2003/0218606 A1 * 11/2003 Zhirkov ................ G06T 15/205
345/419

(Continued)

FOREIGN PATENT DOCUMENTS

WO 2014150159 A1 9/2014
WO 2015048906 A1 4/2015

OTHER PUBLICATIONS

Fan Qiang, Xiaoxia Xu; Libo Cui, "The research about modeling technology of irregular virtual reality scene based on point cloud date," Computer Application and System Modeling (ICCASM), 2010 International Conference on, vol. 6, pp. V6-538, V6-541, Oct. 22-24, 2010.

(Continued)

*Primary Examiner* — YuJang Tswei
(74) *Attorney, Agent, or Firm* — Perry + Currier Inc.

(57) ABSTRACT

A method is provided of generating virtual reality multimedia at a developer computing device having a processor interconnected with a memory. The method comprises: capturing, at the processor, a point cloud representing a scene, the point cloud data including color and depth data for each of a plurality of points corresponding to locations in the capture volume; generating, at the processor, a two-dimensional projection of a selected portion of the point cloud, the projection including the color and depth data for the selected portion; and storing the two-dimensional projection in the memory.

16 Claims, 24 Drawing Sheets

(51) Int. Cl.
| | |
|---|---|
| *G06T 15/20* | (2011.01) |
| *G06T 19/00* | (2011.01) |
| *H04N 13/161* | (2018.01) |
| *H04N 13/204* | (2018.01) |
| *H04N 13/279* | (2018.01) |
| *H04N 13/344* | (2018.01) |
| *H04N 13/366* | (2018.01) |
| *H04N 21/854* | (2011.01) |

(52) U.S. Cl.
CPC ......... *H04N 13/344* (2018.05); *H04N 13/366* (2018.05); *H04N 21/854* (2013.01); *G06T 19/00* (2013.01); *G06T 2207/10028* (2013.01); *G06T 2210/56* (2013.01); *G06T 2215/16* (2013.01); *H04N 13/161* (2018.05); *H04N 13/204* (2018.05); *H04N 13/279* (2018.05); *H04N 2213/003* (2013.01)

(56) References Cited

U.S. PATENT DOCUMENTS

| | | | |
|---|---|---|---|
| 2006/0050091 A1* | 3/2006 | Shoemaker | G06T 17/20 345/661 |
| 2009/0232355 A1 | 9/2009 | Minear et al. | |
| 2009/0244309 A1* | 10/2009 | Maison | G06K 9/00369 348/222.1 |
| 2010/0053152 A1 | 3/2010 | Lewis et al. | |
| 2012/0098864 A1* | 4/2012 | Chowdhry | G09G 5/14 345/660 |
| 2013/0100119 A1 | 4/2013 | Evertt et al. | |
| 2013/0257864 A1* | 10/2013 | Neuman | G06T 15/08 345/419 |
| 2014/0049537 A1* | 2/2014 | Sahoo | G06T 19/006 345/419 |
| 2014/0191938 A1 | 7/2014 | Ybanez Zepeda | |
| 2014/0210940 A1* | 7/2014 | Barnes | H04N 13/0022 348/36 |
| 2014/0240501 A1 | 8/2014 | Newman et al. | |
| 2014/0267616 A1 | 9/2014 | Krig | |

OTHER PUBLICATIONS

International Search Report dated Aug. 11, 2015 issued from the Canadian Intellectual Property Office relating to corresponding PCT International Application No. PCT/CA2015/000306.
Written Opinion dated Aug. 11, 2015 issued from the Canadian Intellectual Property Office relating to corresponding PCT International Application No. PCT/CA2015/000306.
International Search Report dated Feb. 17, 2016 issued from the Canadian Intellectual Property Office relating to PCT International Application No. PCT/IB2015/058987.
Written Opinion dated Feb. 17, 2016 issued from the Canadian Intellectual Property Office relating to PCT International Application No. PCT/IB2015/058987.
Fangiang et al., The Research about Modeling Technology of Irregular Virtual Reality Scene Based on Cloud Data.
International Preliminary Report on Patentability (IPRP), dated Nov. 14, 2017, by ISA/CA, re PCT International Patent Application No. PCT/IB2015/058987.
EPO, Extended European Search Report, dated Mar. 27, 2018, re European Patent Application No. 15792019.0.
Smolic, Aljoscha, et al. "Development of a new MPEG standard for advanced 3D video applications." Image and Signal Processing and Analysis, 2009. ISPA 2009. Proceedings of 6th International Symposium on. IEEE, 2009.
Smolic, Aljoscha. "3D video and free viewpoint video—From capture to display." Pattern recognition 44.9 (2011): 1958-1968.
Smolic, Aljoscha, et al. "3D video and free viewpoint video—technologies, applications and MPEG standards." Multimedia and Expo, 2006 IEEE International Conference on. IEEE, 2006.
Anonymous: "Vision on 3D Video Coding", 87. MPEG Meeting; Feb. 2, 2009-Jun. 2, 2009; Luasanne; (Motion Picture Expert Group or ISO/IEC JTC1/SC29/WG11), No. N10357, Feb. 6, 2009.
USPTO, Non-Final Rejection, dated Jul. 13, 2018, re U.S. Appl. No. 15/573,682.
CIPO, Examination Report, dated Jun. 14, 2018, re Canadian Patent Application No. 2948903.

* cited by examiner

METHOD, SYSTEM AND APPARATUS FOR GENERATION AND PLAYBACK OF VIRTUAL REALITY MULTIMEDIA

CROSS-REFERENCE TO RELATED APPLICATION

This application claims priority from U.S. provisional patent application No. 61/992,488, filed May 13, 2014 and entitled "Virtual Reality System and Method", the contents of which are incorporated herein by reference.

FIELD

The present specification relates generally to computer based video and more specifically relates to a virtual reality system and method. The term "Virtual reality" is used herein in a general sense that can apply to, for example, traditional virtual reality, augmented reality or mixed reality systems.

BACKGROUND

With the Motion Pictures Expert Group (MPEG) standards, and related standards, digital two dimensional video is now well understood and commercially scaled. Likewise advances in digital three dimensional video are now reducing costs and improving access thereto.

By the same token virtual reality in video gaming is becoming increasingly understood and appliances like the Oculus Rift from Oculus VR, Inc. California USA are permitting increased access to virtual reality experiences. However, many challenges remain with virtual reality computing systems and methods. Early attempts at integrating video into virtual reality while succeeding at integrating stereoscopic images with 360 degrees are focusing on fixed interpupillary distance solutions that require a stream of video per eye. Finding a solution that provides streams of video information that can be viewed from multiple user heights, with multiple interpupillary distances, and react to position tracking with the proper parallax all while maintaining scene continuity (no missing pixels due to occlusion) remains elusive.

SUMMARY

According to an aspect of the specification, a method is provided of generating virtual reality multimedia at a developer computing device having a processor interconnected with a memory, comprising: capturing, at the processor, a point cloud representing a scene, the point cloud data including colour and depth data for each of a plurality of points corresponding to locations in the capture volume; generating, at the processor, a two-dimensional projection of a selected portion of the point cloud, the projection including the colour and depth data for the selected portion; and storing the two-dimensional projection in the memory.

According to another aspect of the specification, a developer computing device is provided, comprising: a memory; and a processor interconnected with the memory, and configured to perform the above method.

According to a further aspect of the specification, a method of virtual reality multimedia playback is provided in a consumer computing device having a processor interconnected with a memory and a display, comprising: receiving a two-dimensional projection of a point cloud, the projection including colour and depth data for the point cloud; regenerating the point cloud from the two-dimensional projection; and rendering the point cloud on the display.

According to a further aspect of the specification, a consumer computing device, comprising: a memory; a display; and a processor interconnected with the memory and the display, and configured to perform the above method.

According to a further aspect of the specification, a system for generation and playback of virtual reality multimedia is provided, comprising the above developer computing device, the above consumer computing device, and a capture setup connected to the developer computing device for capturing the point cloud.

BRIEF DESCRIPTIONS OF THE DRAWINGS

Embodiments are described with reference to the following figures, in which.

Figure 8:
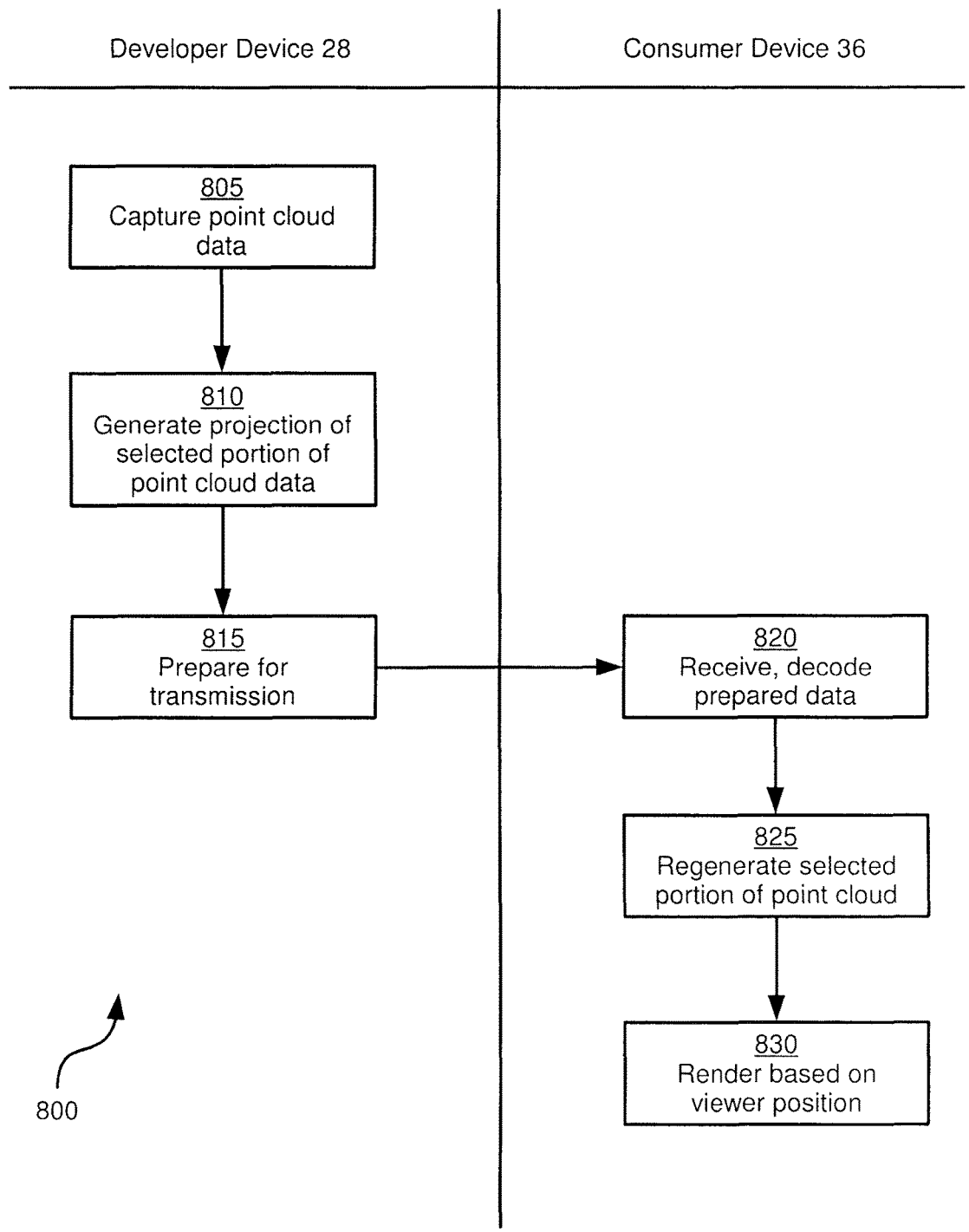
FIG. 8 depicts a method for generation and playback of virtual reality multimedia data, according to a non-limiting embodiment.
Figure 23:
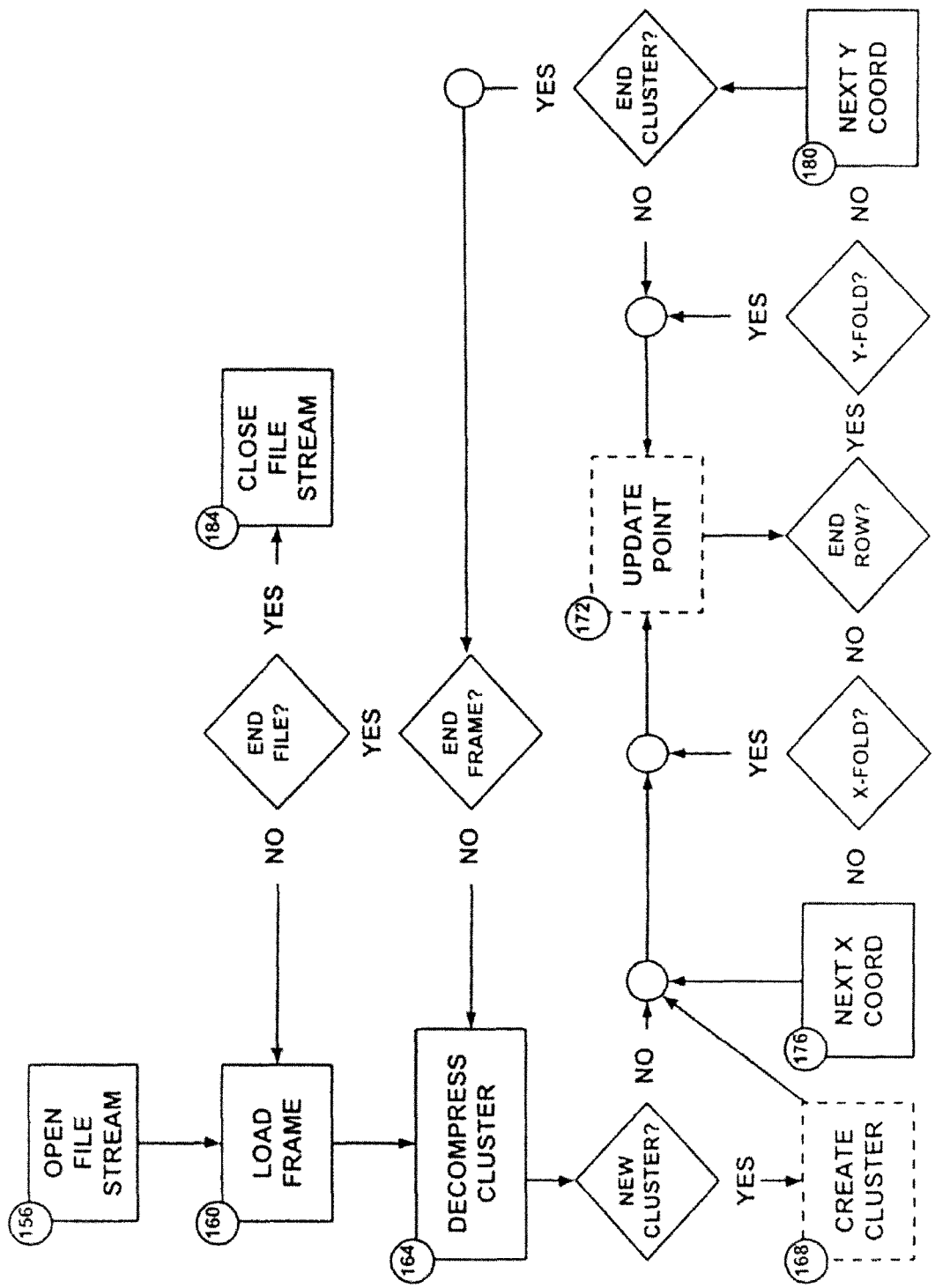
Figure 24:
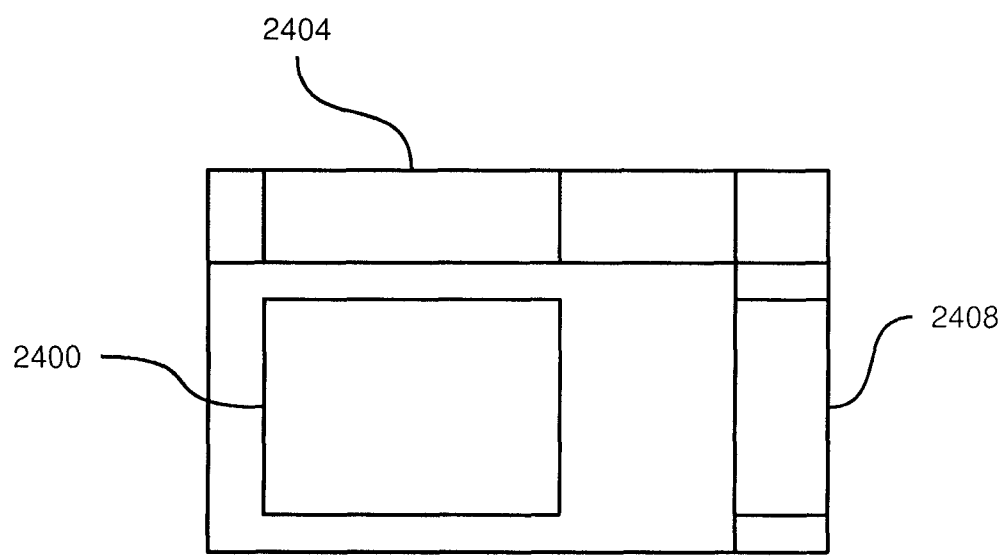

FIG. 23 depicts an example of the performance of blocks 820 and 825 of the method of FIG. 8, according to a non-limiting embodiment; and FIG. 24 depicts a schematic diagram of an optimized rendering process for block 830 of the method of FIG. 8, according to a non-limiting embodiment.

DETAILED DESCRIPTION OF THE EMBODIMENTS

Figure 1:
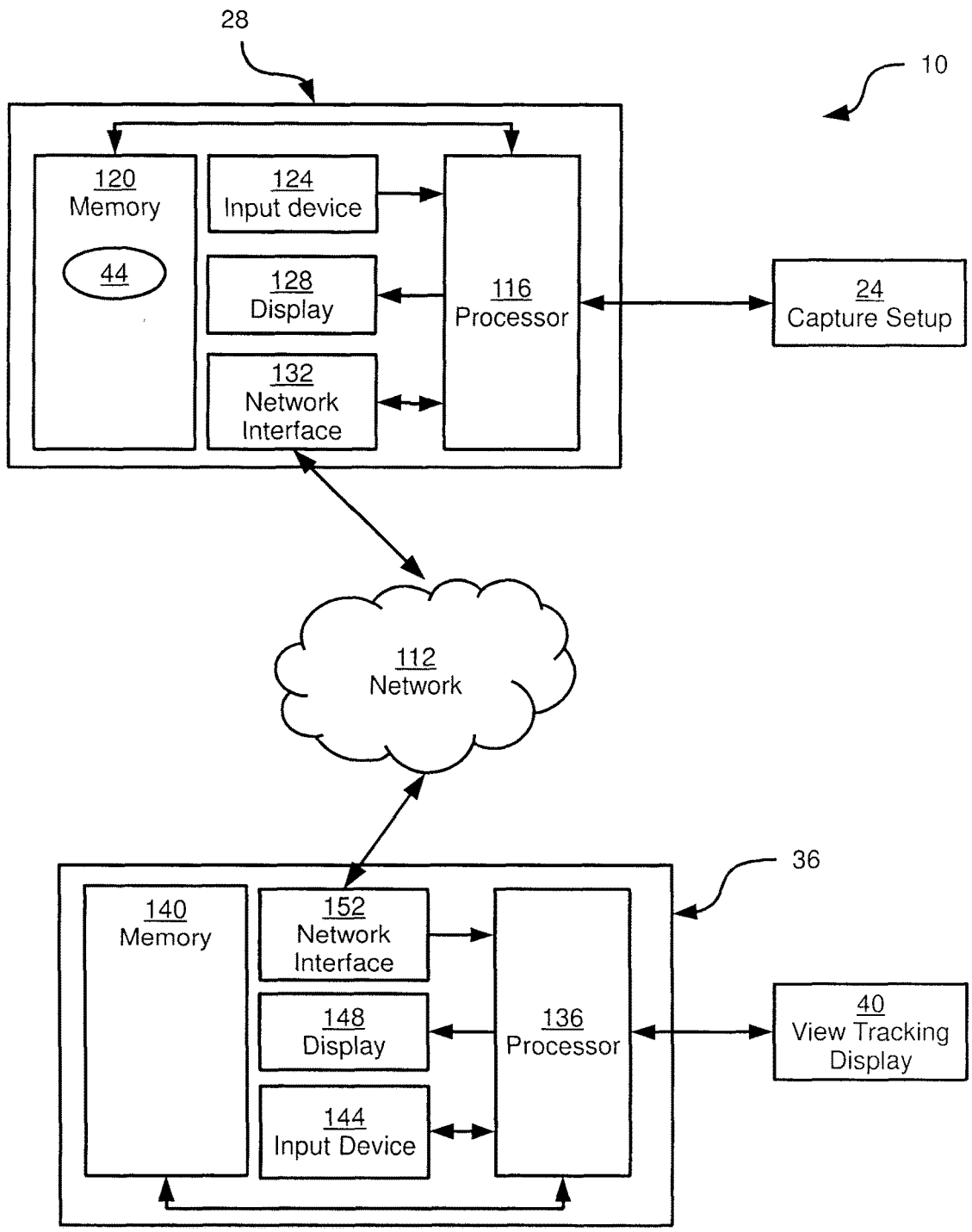
FIG. 1 depicts a system for generation and playback of virtual reality multimedia data, according to a non-limiting embodiment.

FIG. 1 depicts a system 10 for generation and playback of virtual reality multimedia data. For example, system 10 is configured to generate and play back virtual reality video data (which may be accompanied by audio data) that simulates the physical presence of the viewer within the scene depicted by the video. Thus, for example, movement of the viewer's head can be tracked and used to update the appearance of the video.

System 10 includes a generation computing device 28, also referred to as developer computing device 28, developer device 28, or simply as device 28. Developer device 28, in brief, is configured to generate the above-mentioned multimedia data. System 10 further includes a client computing device 36, also referred to as consumer computing device 36, consumer device 36, or simply as device 36. Consumer device 36 is configured to receive the multimedia data generated by developer device 28 and play back the multimedia data. The multimedia data can be transferred between developer device 28 and consumer device 36 via a network 112, for example. Network 112 can include any suitable combination of wired and wireless networks, including but not limited to a Wide Area Network (WAN) such as the Internet, a Local Area Network (LAN) such as a corporate data network, cell phone networks, WiFi networks, WiMax networks and the like.

In some embodiments, intermediate computing devices such as content storage servers (not shown) can participate in the transfer of the multimedia data from developer device 28 to consumer device 36. In further embodiments, the multimedia data can be transferred via physical media (e.g. optical discs, flash storage, and the like) rather than via network 112.

Developer device 28 can be based on any suitable computing environment, such as a server or personal computer. In the present example, developer device 28 is a desktop computer housing one or more processors, referred to generically as a processor 116. The nature of processor 116 is not particularly limited. For example, processor 116 can include one or more general purpose central processing units (CPUs), and can also include one or more graphics processing units (CPUs). The performance of the various processing tasks discussed herein can be shared between such CPUs and GPUs, as will be apparent to a person skilled in the art.

Processor 116 is interconnected with a non-transitory computer readable storage medium such as a memory 120. Memory 120 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 120 includes both a volatile memory and a non-volatile memory. Processor 116 and memory 120 are generally comprised of one or more integrated circuits (ICs), and can have a wide variety of structures, as will now be apparent to those skilled in the art.

Developer device 28 can also include one or more input devices 124 interconnected with processor 116. Input device 124 can include any suitable combination of a keyboard, a mouse, a microphone, and the like. Such input devices are configured to receive input and provide data representative of such input to processor 116. For example, a keyboard can receive input from a user in the form of the depression of one or more keys, and provide data identifying the depressed key or keys to processor 116.

Developer device 28 further includes one or more output devices interconnected with processor 116, such as a display 128 (e.g. a Liquid Crystal Display (LCD), a plasma display, an Organic Light Emitting Diode (OLED) display, a Cathode Ray Tube (CRT) display). Other output devices, such as speakers (not shown), can also be present. Processor 116 is configured to control display 128 to present images to an operator of developer device 28.

Developer device 28 also includes one or more network interfaces interconnected with processor 116, such as a network interface 132, which allows developer device 28 to connect to other computing devices (e.g. consumer device 36) via network 112. Network interface 132 thus includes the necessary hardware to communicate over network 112.

System 10 also includes, connected to processor 116 via any suitable interface, a multimedia capture apparatus such as a capture setup 24. In general, capture setup 24 captures video (with or without accompanying audio) of an environment or scene and provides the captured data to developer device 28. Capture setup 24 will be described below in greater detail. In some embodiments, the multimedia capture apparatus can be virtual rather than the physical capture setup 24 shown in FIG. 1. For example, the multimedia capture apparatus can be provided by way of a three-dimensional animation application 44 stored in memory 120 and executable by processor 116 to create multimedia data.

Consumer device 36 can be based on any suitable computing environment, such as a personal computer (e.g. a desktop or laptop computer), a mobile device such as a smartphone, a tablet computer, and the like. Consumer device 36 includes a processor 136 interconnected with a memory 140, an input device 144, a display 148 and a network interface 152. Processor 136, memory 140, input device 144, display 148 and network interface 152 can be substantially as described above in connection with the corresponding components of developer device 28.

In addition, system 10 includes a view tracking display 40 connected to processor 136 of consumer device 36 via any suitable interface. View tracking display 40 is any suitable device comprising at least one display and a mechanism to track movements of an operator. For example, view tracking display 40 can be a head mounted display device with head tracking, such as the Oculus Rift from Oculus VR, Inc. based in California, USA. It will now be apparent to those skilled in the art that view tracking display 40 may include a processor, memory and communication interfaces beyond those of consumer device 36. In addition, in some embodiments, consumer device 36 and view tracking display can be integrated, such that view tracking display 40 itself includes the components of consumer device 36.

In general, as will be described below, developer device 28 is configured, via the execution by processor 116 of applications consisting of computer readable instructions maintained in memory 120, to receive multimedia data from capture setup 24 (or application 44), and to carry out various actions on the multimedia data to package the data for transmission to consumer device 36. Consumer device 36, in turn, is configured via the execution by processor 136 of applications consisting of computer readable instructions maintained in memory 140, to receive the packaged multimedia data generated by developer device 28, and perform various actions on the packaged multimedia data to "unpackage" the data and control view tracking display 40 to present the unpackaged data.

Figure 2:
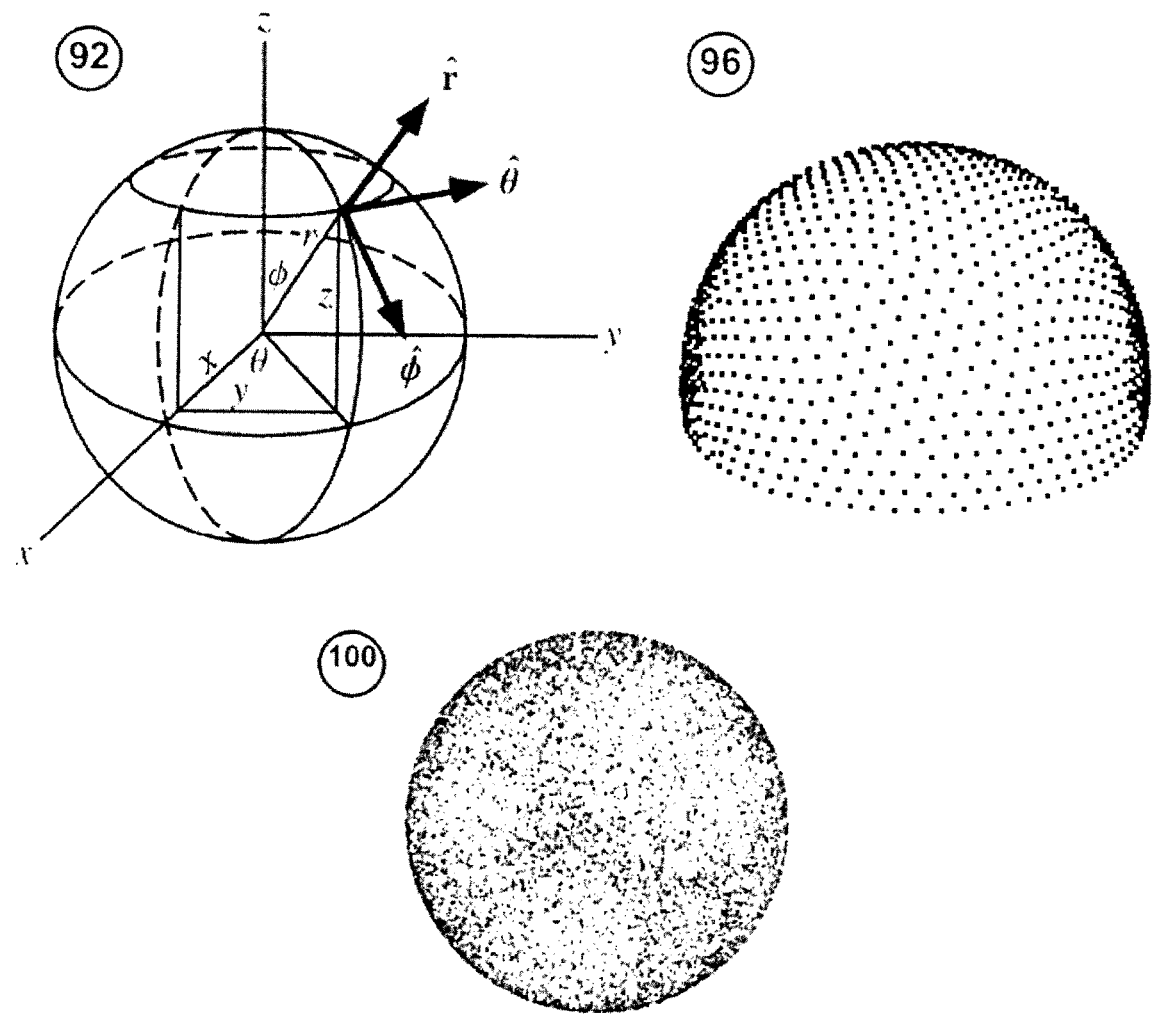
FIG. 2 depicts reference diagrams for spherical coordinates, and point clouds placed using spherical coordinates, according to a non-limiting embodiment.

For an illustration of the nature of the above-mentioned multimedia data, reference is now made to FIG. 2. FIG. 2 shows an axis diagram of a spherical coordinate system 92, in which (as will be appreciated by those skilled in the art) the position of a point can be described in terms of (i) the distance "r" of the point from the origin (the centre of the sphere), which may also be referred to as the depth of the point (ii) the azimuthal angle "θ" between the x-axis and the projection of the point onto the x-y plane, and (iii) the polar angle "ϕ" between the z-axis and a line segment extending from the origin to the point.

FIG. 2 also depicts a dome (i.e. a portion of a sphere) of spherically placed points placed at equal depths 96, and a full sphere of points placed at equal depths 100. To better understand the present specification, imagine the full sphere of points 100 including further points placed within the sphere at different depths and having different colors, to reconstruct a scene from a single viewpoint at the center of the sphere. The use of this structure to provide a panoramic view created by position placed pixels that will respond like the original scene to head movements including but not limited to rotation, translation, and the customization of interpupillary distance and height of the viewer will be referenced from here on in as a point cloud panorama. To recreate a moving scene, each frame of the moving scene is represented as a distinct point cloud panorama similar to the above-mentioned "filled in" version of sphere 100 (in contrast to the traditional representation of moving scenes as a series of two-dimensional pixel arrays). This motion point cloud panorama is the end product of the invention outlined in this specification.

Figure 3:
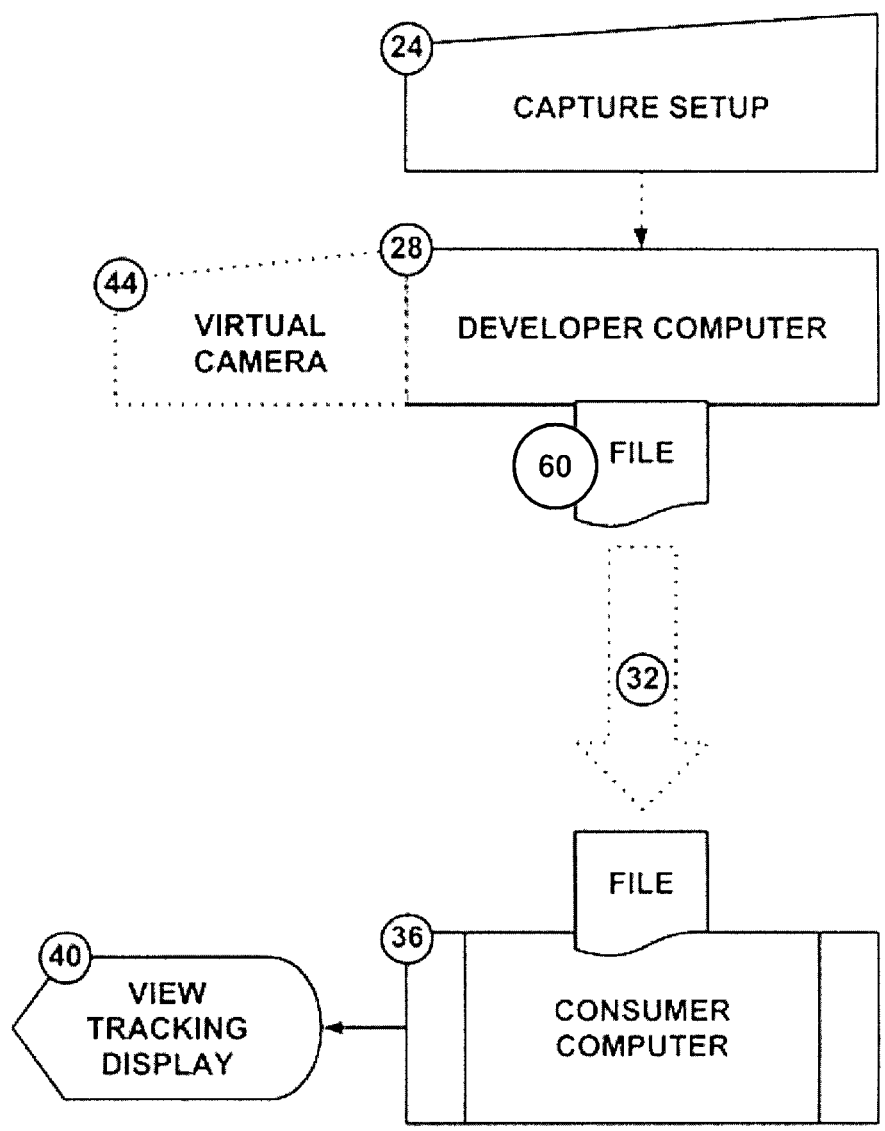
FIG. 3 depicts a process for generation and playback of virtual reality multimedia data, according to a non-limiting embodiment.
Figure 4:
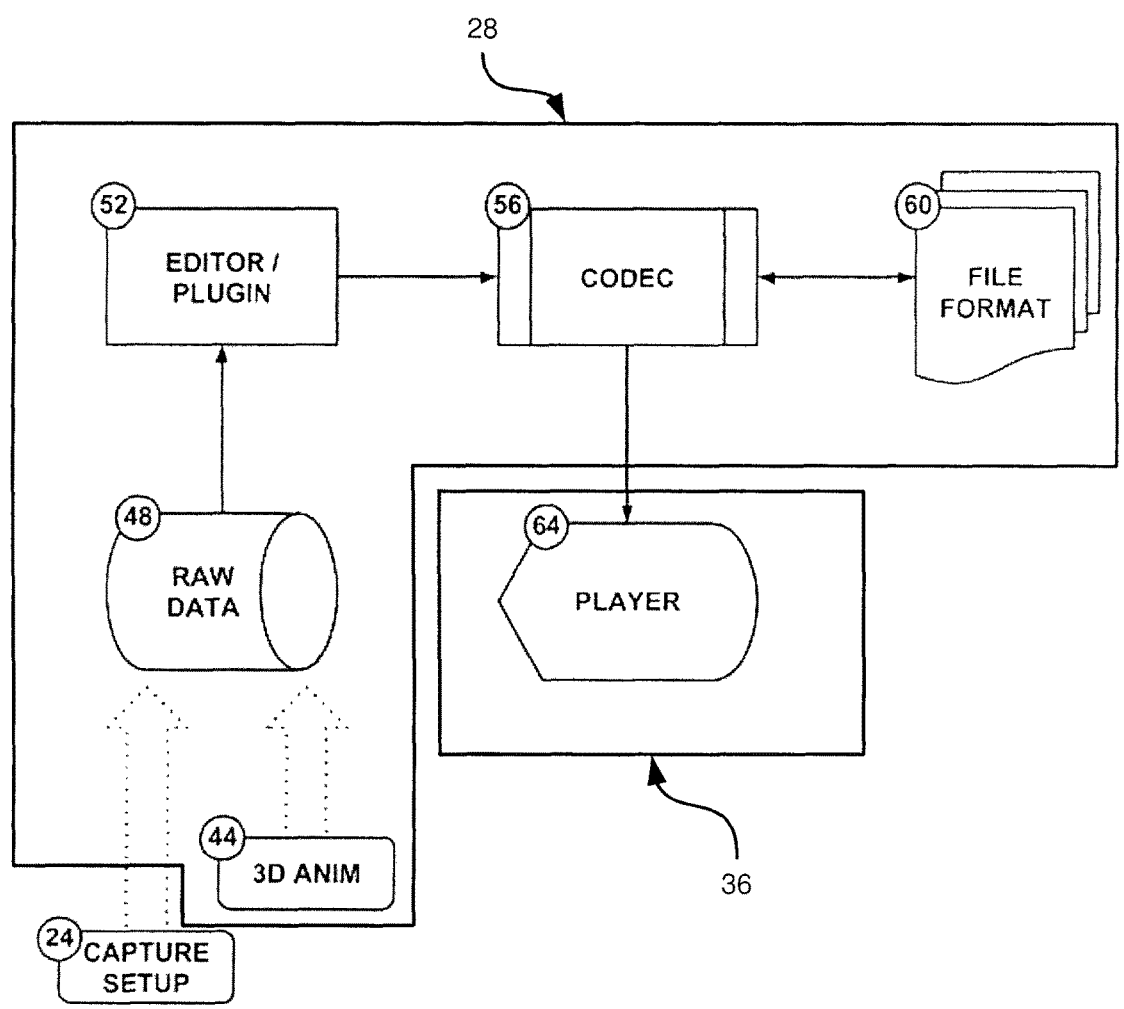
FIG. 4 depicts software components executed in the process of FIG. 3, according to a non-limiting embodiment.

The generalized capture and playback process mentioned above in connection with FIG. 1 is illustrated in FIG. 3. As seen in FIG. 3, capture data from capture setup 24 and/or capture data from a virtual camera in three dimensional animation application 44 are transferred to the developer computer 28. The capture data, referred to as a point cloud 48 (in practice, a time-sequenced plurality of point clouds, each cloud representing the captured scene for a predetermined period of time, like a frame in conventional video). Referring briefly to FIG. 4, developer computer 28 performs the compression and translation from raw point cloud data 48 (received at processor 116 from capture setup 24 or application 44) to a file format 60 optimized for viewing in view tracking display 40, which as mentioned above is typically a head mounted display with head tracking, such as the Oculus Rift from Oculus VR, Inc. California USA.

Referring again to FIG. 3, the file 60, once packaged, can now undergo a file transfer process 32. The file can be transferred in a direct download of final static content, or streaming from a broadcast server (not shown) or directly from developer device 28 in a frame-by-frame manner. In either case, the consumer computer 36 will receive the file 60, as formatted, discussed further in connection with FIG. 18, and decompress the data in file 60 and then reconstruct the point cloud panorama. It will be apparent from the discussion herein that the reconstructed point cloud panorama need not correspond exactly to the originally captured point cloud panorama. The reconstructed point cloud panorama is viewed by placing a virtual camera within the reconstructed point cloud panorama according to orientation and position information provided by the view tracking display 40 device. The player software 64 residing at consumer device 36 for execution by processor 136, that will be discussed further in connection with FIG. 4, then renders the reconstructed point cloud in the appropriate format for the view tracking display 40, simulating the presence of the viewer inside the point cloud panorama (that is, simulating the presence of the operator of view tracking display 40 within the originally recorded scene).

FIG. 4 illustrates an example of the compression and translation activities mentioned above, performed by developer device 28. FIG. 4 depicts certain software components of developer device 28 and consumer device 36; the activities described below are performed by developer device 28 and consumer device 36 via the execution of those software components by processors 116 and 136. A wide variety of other arrangements of software components can also be provided that, via their execution by processors 116 and 136, cause devices 28 and 36 to perform these activities. Other examples of such activities will also be discussed herein.

The raw data 48 is created by either capture setup 24 (e.g. a physical camera comprising of one or more image and/or depth cameras—further embodiments of capture setup 24 will be discussed below), and/or a virtual camera inside of a three dimensional animation application 44, such as Maya from Autodesk Inc. California USA, or a three dimensional real time rendering engine (for remote or cloud virtual reality), such as Unity from Unity Technologies California, USA. The raw data 48 comprises color and position information for point cloud collections of any nature. (Note that color is used in a non-limiting sense contemplated to include subsets of the full color spectrum, including, for example, pure grey scale captures). This raw data 48 is used as input for an Editor/Plug-in 52 that can be an extension of an existing three dimensional capable application, such as Maya from Autodesk Inc. California USA, or a standalone application both running on the developer computer 28 in the hardware example shown in FIG. 1.

Figure 18:
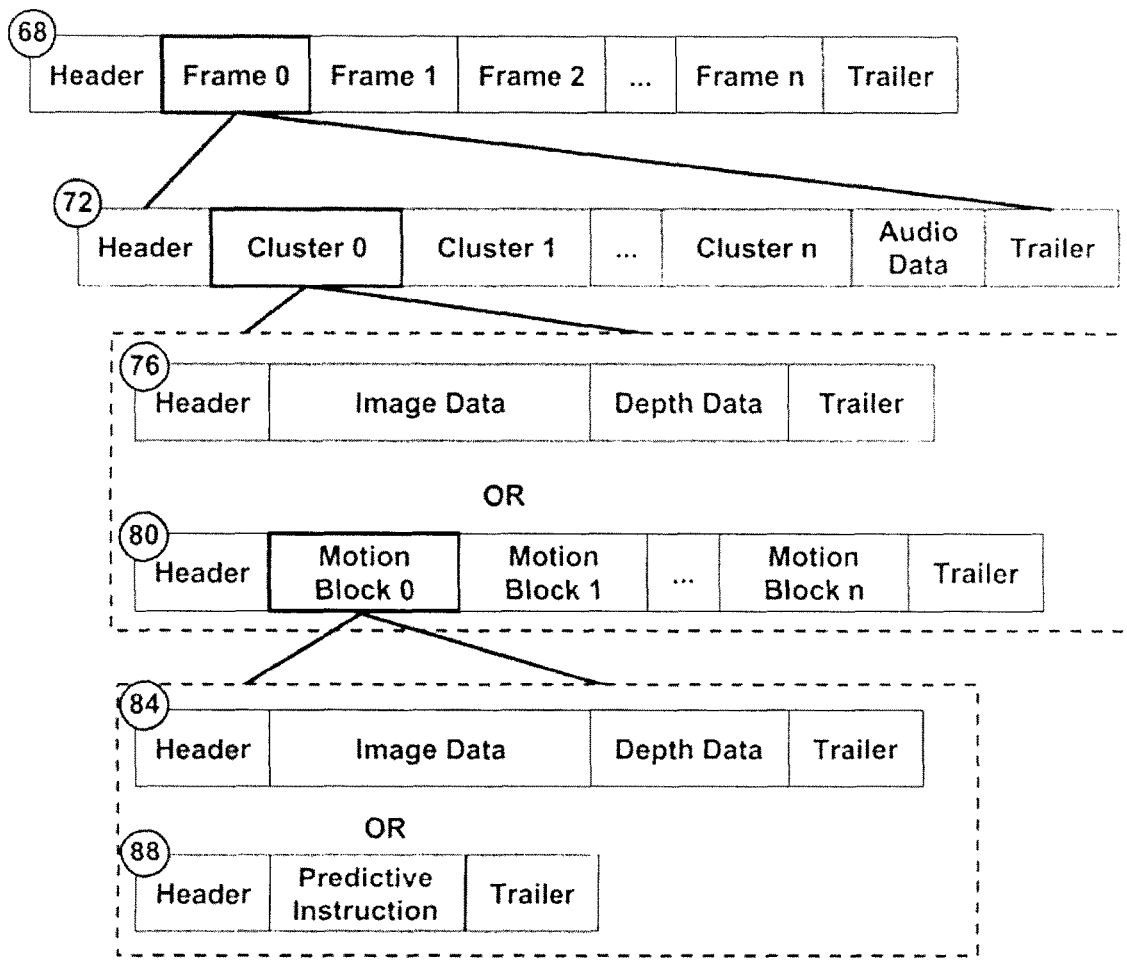
FIG. 18 depicts examples of the file structure obtained via the performance of block 815 of the method of FIG. 8, according to a non-limiting embodiment.

The Editor/Plug-in 52 takes the raw data 48 and performs a process to convert the raw point cloud data 48, into a codec readable structure that is discussed further in connection with FIG. 18. This structure is then compressed into the file format 60 using the codec API 56, also residing on the developer computer 28 in the hardware example from FIG. 1.

The Codec 56 can be implemented as a dynamic linked library that exists on both the developer computer 28 and the consumer computer 64 in the hardware example from FIG. 1. That is, developer device 28 can execute codec 56 to compress raw point cloud data 48 into file 60, and consumer device can execute (another copy of) codec 56 to recreate a point cloud from file 60. In the input stream, the Codec 56 takes clusters of point cloud data, discussed below, from the Editor/Plug-in 52 and then compresses that data for the transmission of the data in the file transfer 32 process shown in FIG. 3. The compression process can include the use of depth information (position information) and traditional image compression techniques to provide improved efficiency of object or blob detection, and because of this, improved usage of translation and rotation methods for reducing bit rates in moving images while reducing the artifacts from the aforementioned compression. This will be discussed in more detail below. The last stage of the Codec 56 input process is the writing of the file using the compressed data structure into the file format 60 discussed further in FIG. 18.

The player 64 is a three dimensional rendering software stored in memory 140 and executable by processor 136, similar to a three dimensional game engine such as Unity from Unity Technologies California, USA, that runs on the consumer computer 36 in the hardware example in FIG. 1. The player identifies the file 60 for viewing and uses the codec 56 to open, and decompress the streamlined file frame by frame (each frame being a reconstructed point cloud). The player 64 uses the codec 56 to load an individual frame and populates colored points around a virtual camera that is then used to render an image to the view tracking display 40. This process is discussed further below.

Before describing in further detail the operation of system 10 to capture and play back multimedia data, a discussion of capture setup 24 will be provided. The discussion below relates to a physical capture setup, but can also be simulated by application 44 at developer device 28.

Figure 5:
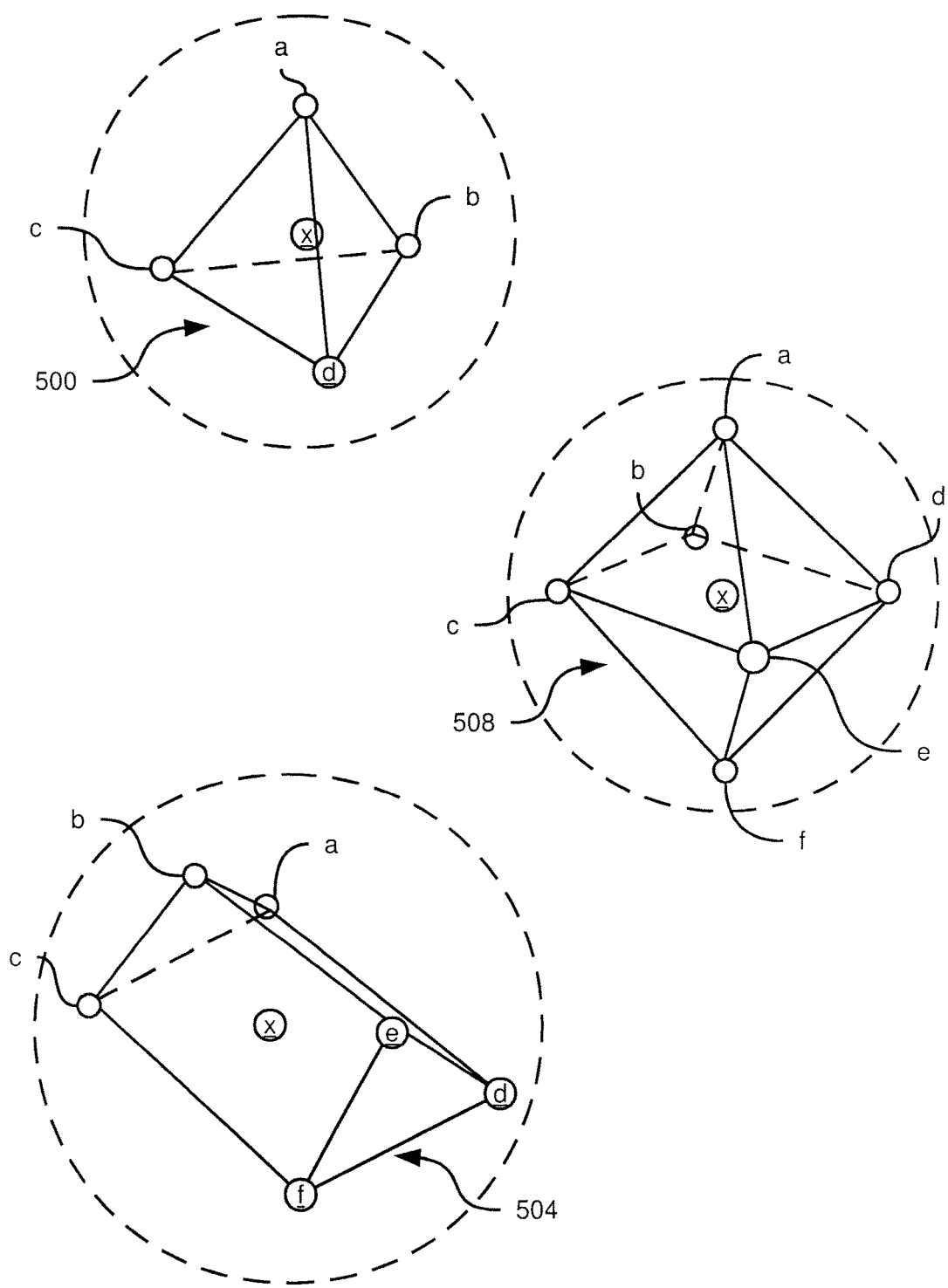
FIG. 5 depicts example capture setups in the system of FIG. 1, according to a non-limiting embodiment.

Referring now to FIG. 5, capture setup 24 comprises one or more panoramic depth and/or image capture devices such as cameras. An arrangement with a single capture device (node) can provide a basic depth scan of an environment, but would not take advantage of the concept of "folding", discussed further below. For example, a Kinect device from Microsoft Inc. of Redmond Wash., can provide a (partial) depth point cloud that has coloured pixels with positions. In the absence of additional nodes, however, such a device does not enable the functionality described herein.

In general, capture setup 24 includes a plurality of nodes. Each node, placed in a distinct position from the other nodes in the volume to be captured, generates colour and depth data for its field of view. In the present example, the field of view for each node is about three hundred and sixty degrees by about three hundred sixty degrees (that is, each node captures data in a full sphere). However, in other embodiments nodes may have reduced fields of view. The nature of the nodes is not particularly limited. For example, each node can include a camera and a depth sensor. In some embodiments, each node may include a plurality of cameras and depth sensors to achieve the above-mentioned field of view. An example of a device that may be employed for each node is the Bublcam by Bubl Technology Inc. of Toronto, Canada.

A wide variety of node arrangements may be employed. The greater the number of nodes, the greater the level of detail (particularly for complex scenes) can be captured in the multimedia data. However, presently preferred example configurations of nodes are discussed further below in relation to FIG. 5.

Figure 6:
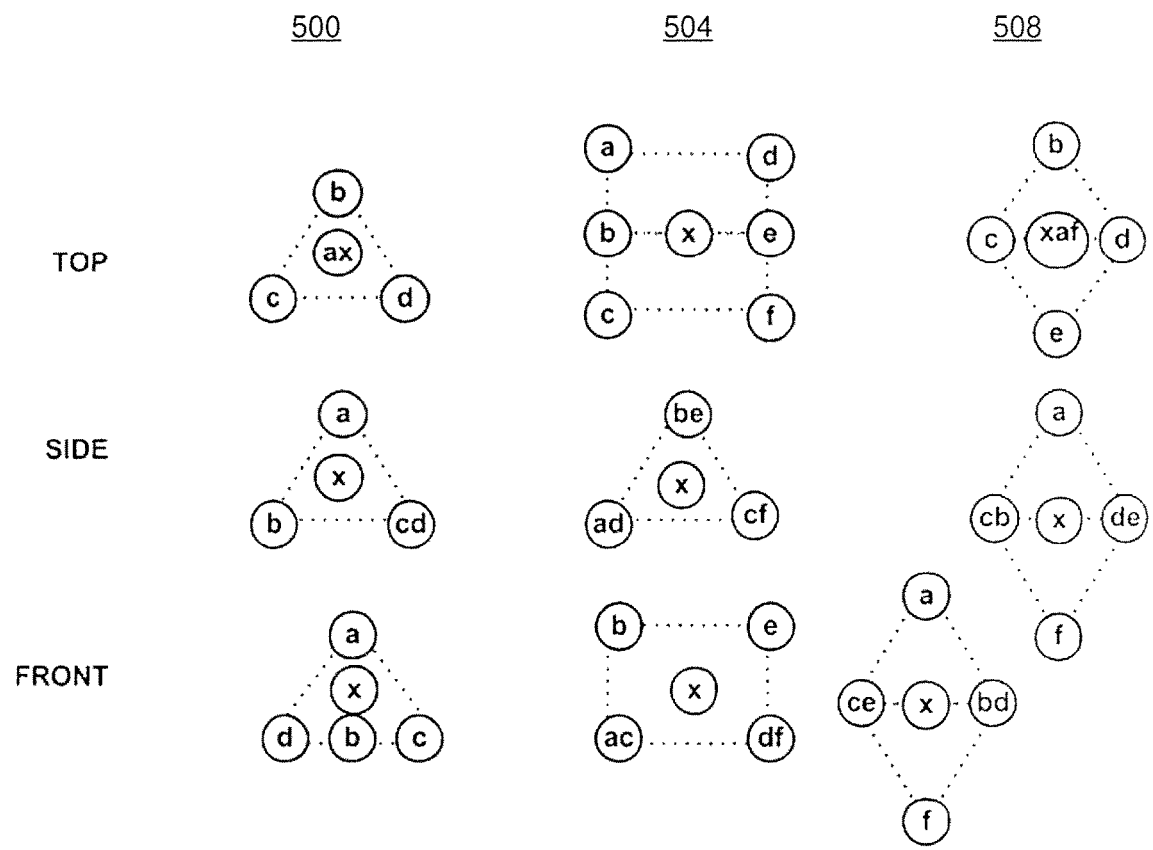
FIG. 6 depicts three-view drawings of the capture setups of FIG. 5, according to a non-limiting embodiment.

Referring now to FIG. 5, three examples 500, 504 and 508 of multi-node capture setups 24 that can be used as the capture setup 24 in FIG. 1 are illustrated. Setup 500 has a tetrahedral shape, setup 504 has the shape of a triangular prism, and setup 508 has an octahedral shape. The captured volumes are also illustrated as dashed-line spheres around each setup (although the actual size of the captured volumes may be larger or smaller than shown in relation to setups 500, 504 and 508). Each setup 500, 504, 508 includes a plurality of capture nodes including a central node x and peripheral nodes a, b, c, d, as well as (for setups 504 and 508) e and f. FIG. 6 illustrates top, side and front views of each of the above-mentioned setups, according to the directions indicated in FIG. 5.

These setups create safe movement zones within the motion point cloud panorama. A safe movement zone describes a volume around the center of the spherical coordinate system (indicated in FIG. 5 by the location of nodes x) in which the point cloud maintains continuity with the original captured space. Outside of this zone missing elements or edges may begin to appear (but will not necessarily begin to appear). In all of the views in FIG. 5 the safe zone is outlined by line segments between nodes; in FIG. 6, the safe zones are illustrated using dotted lines. The user of view tracking display 40 will be able to move their view tracked display 40 within this safe zone with all rotations and positions in the volume supported. Each node, represented as a circle with a letter within or attached, represents a capture device that records color and depth, such as the Kinect for Windows from Microsoft Inc. Seattle USA, which results in a point cloud representation and represents an example of the raw data 48 (more specifically, a portion of raw data 48; together the data captured by all nodes together represents raw data 48). More generally, safe zones are those in which any point within the safe zone is viewed by at least two, and preferably at least three, nodes, to capture parallax.

Figure 7:
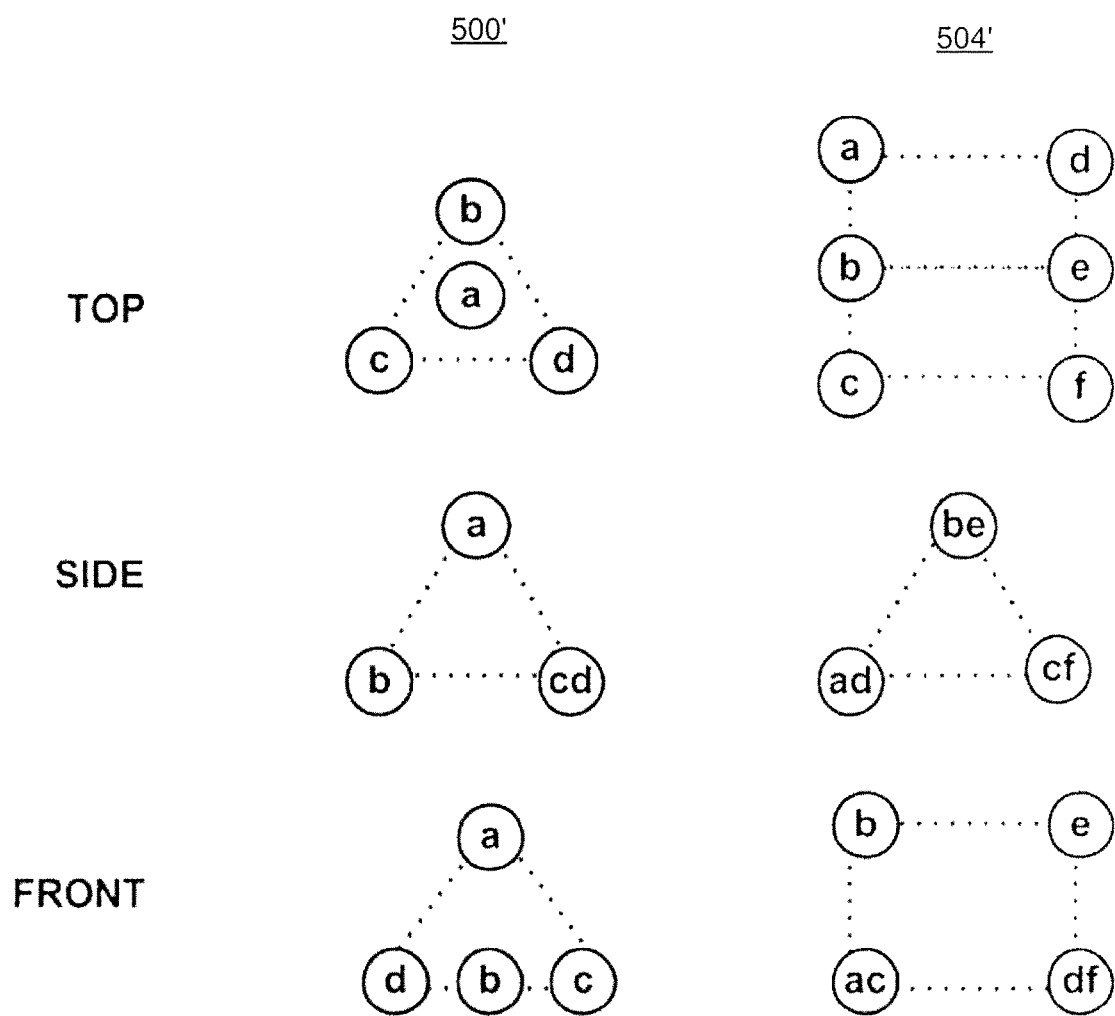
FIG. 7 depicts three-view drawings of variants of the capture setups of FIG. 5, according to a non-limiting embodiment.

In other embodiments, the central nodes x can be omitted. FIG. 7 depicts variants 500' and 504' of setups 500 and 504, in which central nodes x are omitted. A wide variety of other capture setups 24 will now occur to those skilled in the art.

In some embodiments, more complex capture setups may be employed. As will now be apparent to those skilled in the art, capture setups 500, 504 and 508 enable the capture of sparse light fields. More complete light fields may be captured with other capture setups. For example, when capturing from a virtual camera in a 3D application like Maya (e.g. application 44), a modification can be made to the process that may allow for better results. In the virtual camera, we can start with a capture (360 color/depth) at the central node. We can now move the camera incrementally along lines between the central node and the outer nodes (e.g. between node x and nodes a, b, c, d in setup 500) creating an estimated image using our 360 color/depth data. This estimate will begin to show holes as we move to areas previously occluded. Once we get holes, we can render out the missing areas (depth and color) and add them to the point cloud. The movement of the (virtual) central node provides capture data for a number of points between the central node and the outer nodes, and thus the appearance of each point in the captured volume is captured from a significantly larger number of viewpoints than in the setups shown in FIG. 5.

The movement of the (virtual) central node (or any other suitable node) enables system 10 to capture the light field estimate for surfaces that have view dependent coloring (specular, reflection, refraction). Moving the camera between nodes incrementally captures the color for points within the captured node at a plurality of different viewpoints (highly reflective surfaces, for example, may change dramatically in appearance based on the location of the viewpoint). This enables the analysis of the light field distribution and the creation of an appropriate estimation for rendering later on.

Having described system 10 and capture setup 24, the operation of system 10 to generate and play back virtual reality multimedia will now be described in greater detail. Referring to FIG. 8, a method 800 of capturing and playback of virtual reality multimedia is illustrated. The performance of method 800 is described below in conjunction with its performance in system 10, although method 800 may also be performed in other suitable systems. The blocks of method 800 are described below as being performed by developer device 28 and consumer device 36. It will be understood that devices 28 and 36 perform these blocks via the execution of computer-readable instructions stored in memories 120 and 140 by processors 116 and 136, respectively.

At block 805, developer device 28 is configured to capture point cloud data as described above, whether through the execution of application 44 or through the control of capture setup 24. The point cloud data includes colour and depth values for each of a plurality of points within a capture volume. Further, the captured point cloud data can include a plurality of sets of point cloud data, with each set representing the captured volume (the scene to be displayed to the end user, that is) at different moments in time. In other embodiments, as mentioned above, the point cloud data may be represented by light field data; however, for simplicity of illustration, point-wise colour and depth will be discussed below. The format of the point cloud data is not particularly limited. An example of point cloud capture will be discussed below in connection with FIG. 9.

At block 810, developer device 28 is configured, for each of the above-mentioned sets of point cloud data (that is, for each frame of the resulting video), to generate a projection of a selected portion of the point cloud data. In other words, developer device 28 is configured to select a portion of the point cloud data, and place each point of the selected portion in a two-dimensional image. Projection can therefore involve the replacement of the original point's coordinates (e.g. spherical coordinates) with two-dimensional coordinates (e.g. x and y). A depth value is also stored with each projected point. In general, the portion of the point cloud data selected for projection is selected based on a virtual viewpoint whose location is set at the developer device 28. Examples of selection and projection will be discussed in further detail below in connection with FIG. 10.

The performance of block 810 for each "frame" results in a plurality of two-dimensional frames, each accompanied with depth data. In addition, at block 810 each frame may be supplemented with "folds", additional colour and depth data representing points in the capture volume that were not included in the projection but that may be rendered visible at the view tracking display 40 in response to movement of the operator's head. In other words, folds represent points in the capture volume that are behind the projected points, relative to the virtual viewpoint mentioned above. The generation and storage of folds will be discussed below in connection with FIG. 10.

At block 815, developer device 28 is configured to prepare the frames generated at block 810 for transmission to consumer device 36. The preparation of the frames for transmission can include the execution of codec 56, as mentioned earlier. For example, the projected two-dimensional colour data (for the projection or folds) can be compressed using conventional image compression techniques. The depth data may be left uncompressed, or different compression techniques may be applied to the depth data.

Once the multimedia data is prepared for transmission, the above-mentioned file transfer process can take place. The nature of the file transfer process is not particularly limited, either in terms of the medium over which the transfer is performed (e.g. wired or wireless network links, physical storage media, and so on), or in terms of the timing (e.g. the transfer can occur immediately after preparation, or any suitable period of time after preparation).

Figure 20:
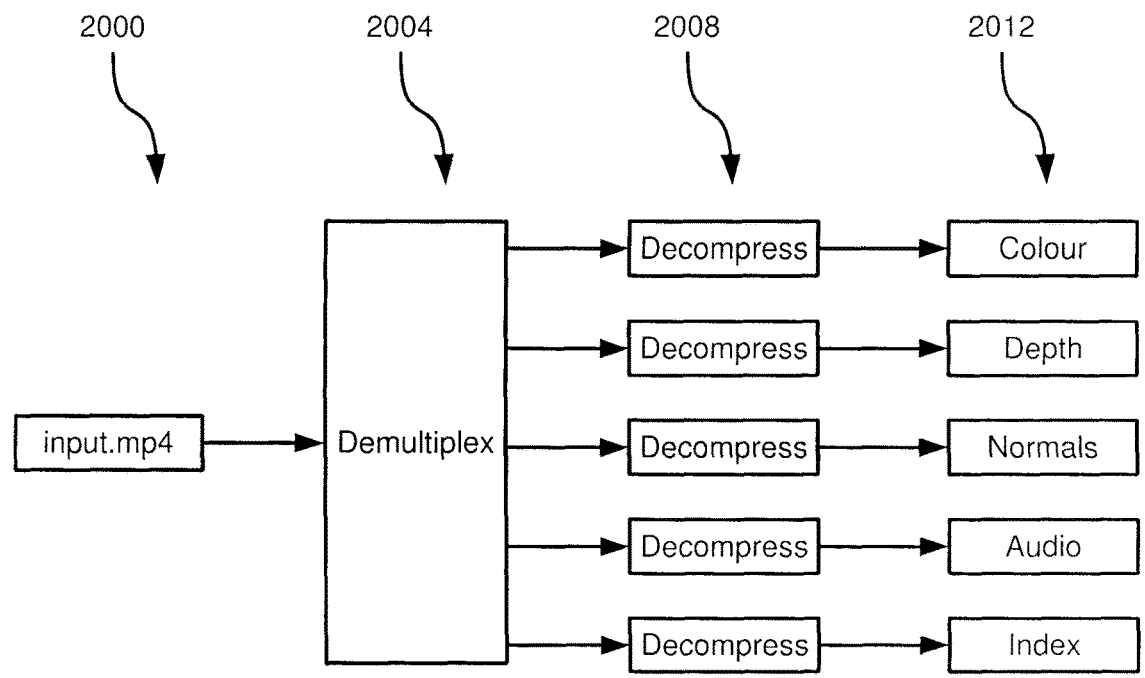
FIG. 20 depicts an example of the performance of block 820 of the method of FIG. 8, according to a non-limiting embodiment.

At block 820, consumer device 36 is configured to receive the data as prepared at block 815, and decode the prepared data. The decoding implemented at consumer device 36 is generally performed via the execution of the same codec 56 as was employed at developer device 28 to prepare the multimedia data for transmission. At block 820, therefore, consumer device 36 is configured to recover, from the data prepared at block 815 (and subsequently transferred to consumer device 36), the projections generated by developer device 28 at block 810. Examples of the decoding process at block 820 will be described below in connection with FIGS. 20 and 23.

At block 825, consumer device 36 is configured, via the execution of the above-mentioned player 64 by processor 136, to regenerate the selection portion of point cloud data that was projected at block 810 by developer device 28. Thus, at block 825, consumer device combines the projections and the accompanying depth data decoded at block 820 to produce a point cloud similar to the point cloud captured at block 805 (but generally only representing a portion of the points in the original point cloud). The regeneration of a partial point cloud will be described below in connection with FIGS. 21-23.

At block 830, consumer device 830 is configured to render the point cloud regenerated at block 825 via view tracking display 40, based on a viewer position determined by view tracking display 40. The rendering of the regenerated point cloud at block 830 will be discussed below in connection with FIG. 23.

Figure 9:
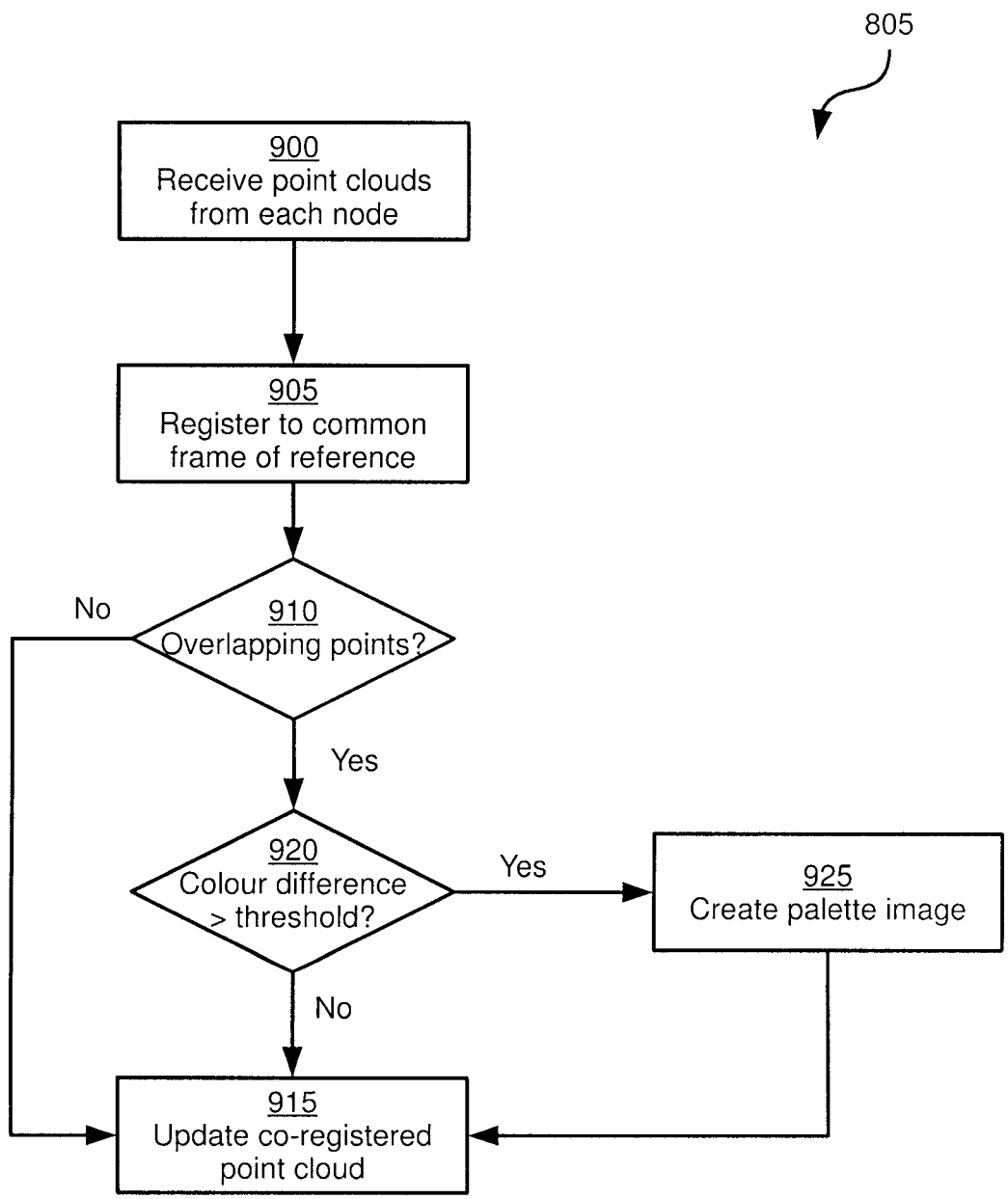
FIG. 9 depicts a method for performing block 805 of the method of FIG. 8, according to a non-limiting embodiment.

Turning now to FIG. 9, an example process for capturing point cloud data at block 805 is illustrated. At block 900, developer device 28 is configured to receive raw point cloud data from each node in capture setup 24. As will be apparent to those skilled in the art from FIG. 5, each node in any given capture setup can generate point cloud data for at least a subset of the capture volume. Processor 116 receives the point cloud data from each node at block 900.

At block 905, developer device 28 is configured to register the sets of point cloud data received at block 900 to a common frame of reference (i.e. the same coordinate space). For example, each node of capture setup 24 can be configured to generate point cloud data in which each point has coordinates centered on the node itself. When the relative locations of the nodes in capture setup 24 are known, the point cloud data from any given node can be transformed via known techniques to a frame of reference centered on the center of the capture volume (e.g. a location coinciding with the location of node x in FIG. 5).

It will now be apparent that when the sets of raw point cloud data are registered to a common frame of reference, a number of locations within the capture volume will be represented multiple times within the co-registered point cloud data. That is, more than one node can have visibility to the same location in the capture volume. Developer device 28 is therefore configured to compress or collapse any overlapping points (whether exactly or only partially overlapping) in the co-registered point cloud data to a smaller number of points.

At block 910 developer device 28 is configured to determine, for each point in the co-registered point cloud data, whether the point overlaps (either exactly or partially) with other points. When the determination is negative, developer device 28 proceeds to block 915, at which the co-registered point cloud data is updated with no change being made to the non-overlapping points (in other words, the update may be a null update). When the determination at block 910 is affirmative for any points, however, developer device 28 can be configured to perform block 920. At block 920, developer device 28 can be configured to determine whether the colour differences between overlapping points is greater than a predetermined threshold. That is, if different nodes record significantly different appearances for the same (or similar) location in the capture volume, that is an indication that the capture volume includes surfaces that are highly reflective, specular or the like.

When the determination at block 920 is negative (e.g. the differences in colour for overlapping points are non-existent or below the above-mentioned threshold), developer device 28 proceeds to block 915 and updates the co-registered point cloud by replacing the overlapping points with a single point. The single point can have a colour value equivalent to an average of the colour values of the original overlapping points, for example.

When the determination at block 920 is affirmative, however, developer device 28 can be configured to create a palette image containing a subset, or all, of the colour values from the overlapping points. A palette image stores a plurality of possible colours for a single point in the co-registered point cloud. The palette image preferably stores possible colours in a two-dimensional array. The colour at the center of the palette image corresponds to the colour of the point when viewed from the center of the point cloud, and colours spaced apart from the center of the palette image in varying directions and at varying distances correspond to the colour of the point when viewed from corresponding directions and distances from the center of the point cloud. In some embodiments, rather than full colour values, the palette image can store only luminance or intensity values, while chrominance or other colour values can be stored in the point itself (along with a reference to the palette image).

At block 915, developer device 28 is then configured to update the co-registered point cloud with an index value pointing to the palette image, in place of a colour value. It is contemplated that in some embodiments, the performance of blocks 920 and 925 can be omitted.

Figure 10:
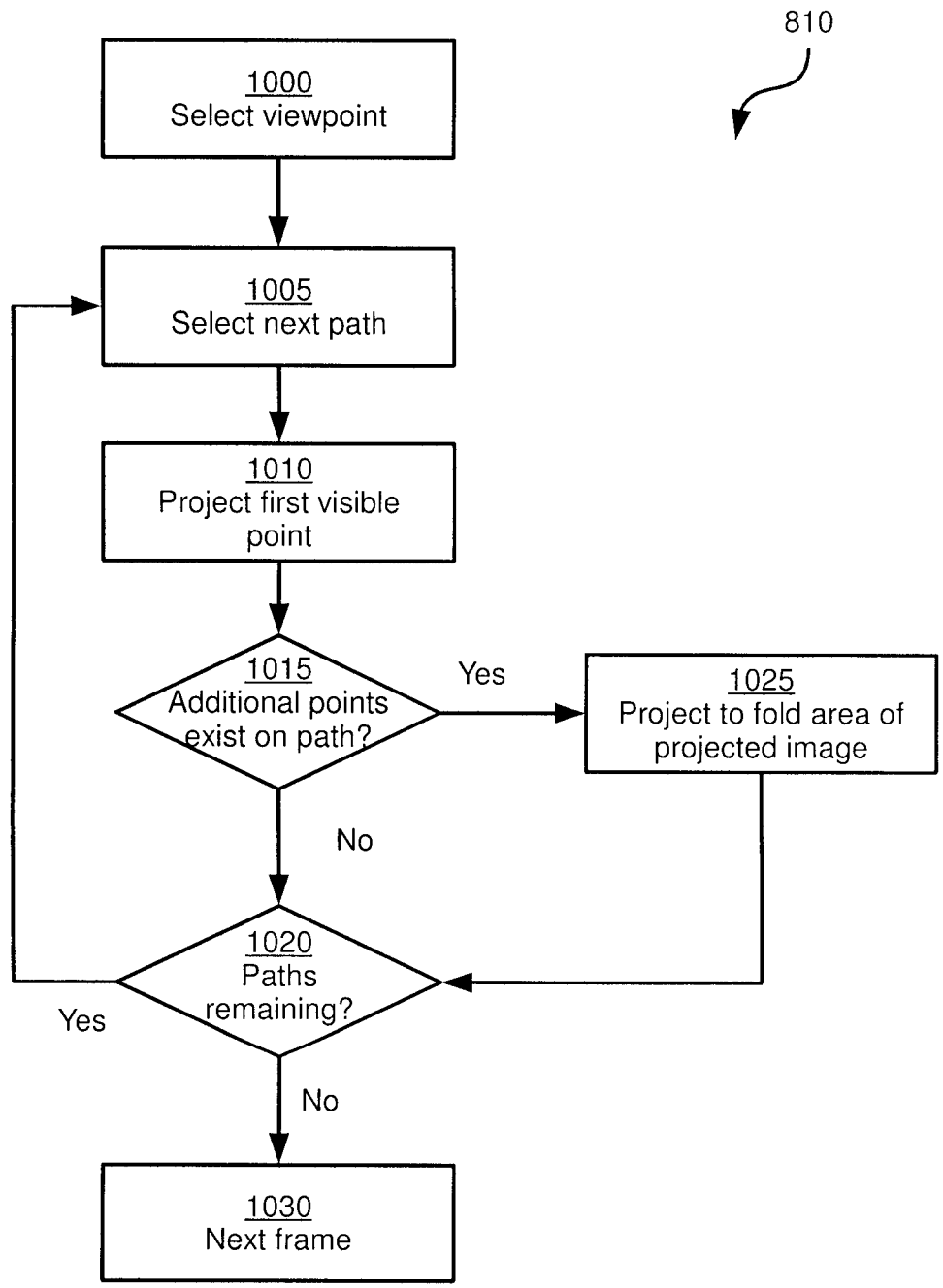
FIG. 10 depicts a method for performing block 810 of the method of FIG. 8, according to a non-limiting embodiment.

Turning now to FIG. 10, an example process for performing block 810 of method 800 is illustrated. At block 1000, having captured point cloud data (for example, having captured raw point cloud data and generated co-registered point cloud data as illustrated in FIG. 9), developer device 28 is configured to select a viewpoint within the capture volume. The selection of a viewpoint is the predicted starting location of the viewer, as detected by the view tracking display 40. For example, the centre of the capture volume may be selected as the viewpoint.

Figure 11:
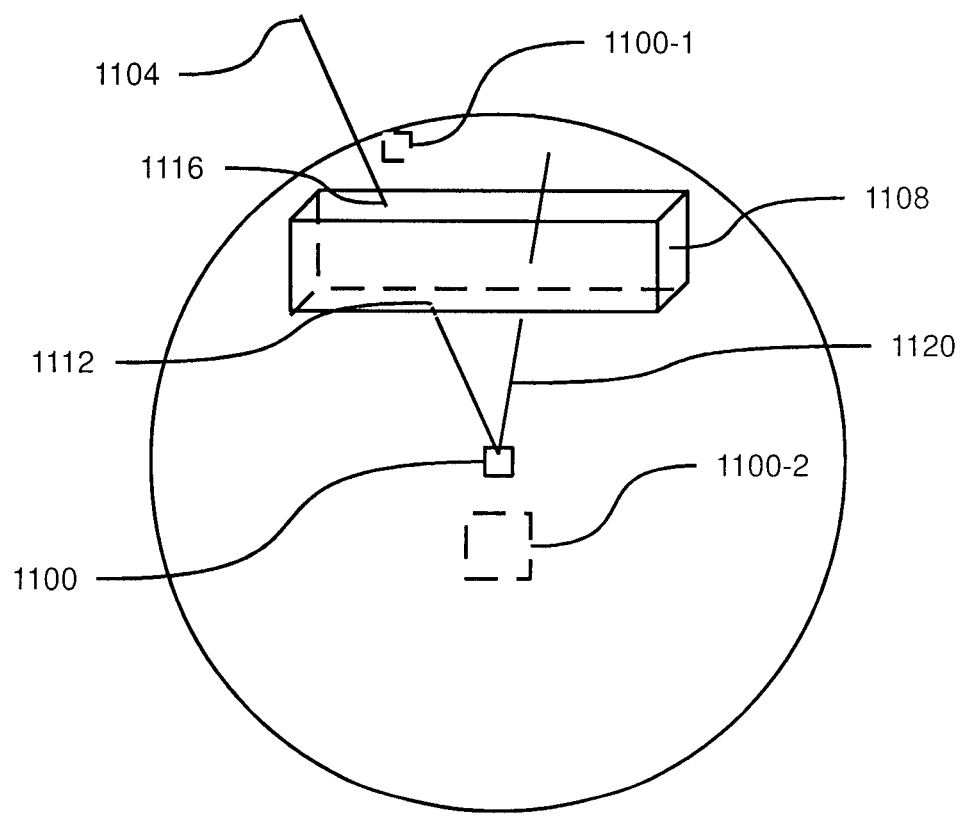
FIG. 11 depicts an example point cloud, according to a non-limiting embodiment.

At block 1005, developer device 28 is configured to select a vector for processing. In the example above, in which point cloud data is stored in spherical coordinates, the selection of a vector comprises selecting azimuthal and polar angles. Other coordinate systems may also be employed, however. In general, at block 1005 developer selects a path extending from the selected viewpoint, but not a depth corresponding to that path. Turning briefly to FIG. 11, an example selected viewpoint 1100 and path 1104 extending from the viewpoint are illustrated.

At block 1010, developer device 28 is configured to project the first point in the point cloud that is visible to the selected viewpoint along the selected path or vector. That is, looking along the path from the viewpoint, the first point that would be "seen" is projected (i.e. added to a two-dimensional image). For example, referring again to FIG. 11, path 1104 intersects an object 1108 at a point 1112 on the "lower" surface of the object. Point 1112 is therefore added to the projection. As will be apparent from FIG. 11, path 1104 also intersects object 1108 at a second point 1116 on the "upper" surface of object 1108. However, from the illustrated location of viewpoint 1100, point 1116 would not be visible.

Returning to FIG. 10, at block 1015, developer device 28 is configured to determine whether additional points exist on the path selected at block 1005. When the determination at block 1015 is negative (i.e. the selected path does not intersect any further points in the point cloud, indicating that the remainder of the point cloud along that path is empty, depicting air, for example), developer device 28 proceeds to block 1020. At block 1020, developer device 28 determines whether all paths have been processed (e.g. whether every increment of polar and azimuthal angles from the selected viewpoint have been processed). When that determination is negative, the performance of method 810 returns to block 1005 for the selection of a further path and further projections.

When the determination at block 1015 is affirmative, however, developer device is configured to perform block 1025. At block 1025, any other points that exist along the path selected at block 1005 can be added to a fold area of the projected image. That is, a portion of the projected image is reserved for points projected at block 1010, and another portion of the projected image is reserved for folds. Folds are the projections of points from the point cloud that are not visible to the viewpoint selected at block 1000, but may become visible if the viewpoint were to move. Referring again to FIG. 11, if viewpoint 1100 were to move, during playback (as would be detected by view tracking display 40), to location 1100-1, point 1116 would become visible (while point 1112 would not be visible).

At block 1025, developer device 28 can be configured to determine, before adding a fold point to the projected image, whether the fold point is within a predicted range of motion of the viewpoint selected at block 1000. That is, the viewpoint can have a predicted maximum travel distance from the initial location, and developer device can omit fold points entirely if such points would only become visible if the viewpoint moved beyond the maximum travel distance. Again referring to FIG. 11, viewpoint 1100-1 may be considered outside of a predetermined range of motion of viewpoint 1100, and thus point 1116 may be omitted from the projected image. Viewpoint 1100-2, however, may be within the predetermined range of motion, and thus a point on the "front" surface of object 1108, that is intersected by another path 1120 but not visible to viewpoint 1100. Thus, the point on the front surface of object 1108 may be added to the projection as a fold point.

When no further paths remain to be processed, developer device 28 proceeds to the next frame at block 1030 (i.e. the next set of point cloud data), and repeats the performance of block 810 to generate another projected image containing fold data.

Figure 12:
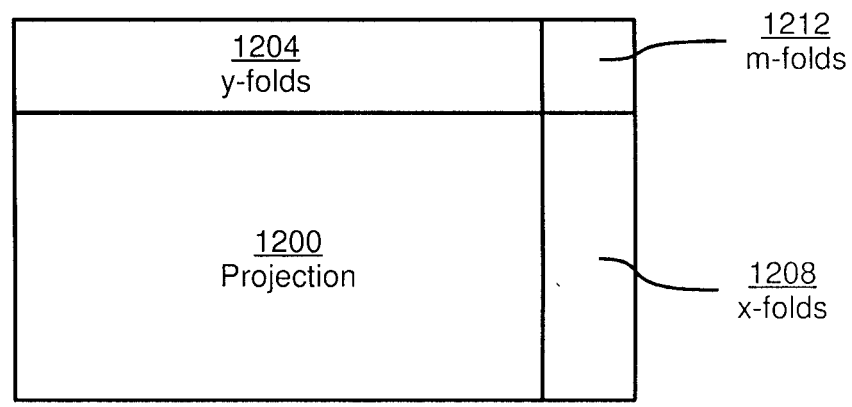
FIG. 12 depicts an example two-dimensional projection generated in the method of FIG. 8, according to a non-limiting embodiment.
Figure 12:
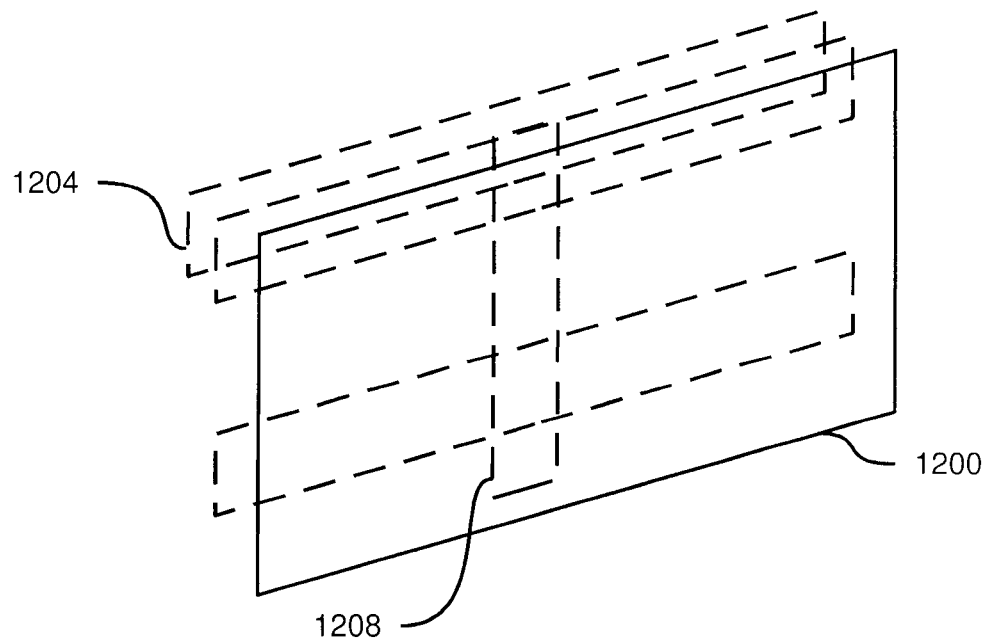

The result of repeated performances of block 810 is a plurality of two-dimensional images containing colour values projected from point cloud data captured by capture setup 24. The images can also contain depth values, or such depth values can be stored in corresponding images (i.e. of similar structure, but containing only depth rather than colour). Turning now to FIG. 12, an example of such an image is illustrated.

The image illustrated in FIG. 12 has a projection area 1200, containing points projected through the performance of block 1010. The image also includes at least one fold area. In the present example, three types of folds are included. A y-folds area of the image is reserved for lines of colour data having the same width as the projected image and corresponding to points "behind" a specific row of the projected image in area 1200. Thus, area 1204 can store an index value in connection with each row of colour values. An x-folds area of the image is reserved for lines of colour data having the same height as the projected image and corresponding to points behind a specific column of the projected image in area 1200. Further, an m-folds area contains specific pixels, indexed by both x and y coordinates, that are behind specific points in the projected image in area 1200.

Which types of folds are implemented is not particularly limited. For example, developer device 28 can be configured to store a y-fold (or an x-fold) instead of m-folds when a substantial portion (e.g. more than eighty percent) of a given set of m-fold points appear on the same row or column.

The lower portion of FIG. 12 illustrates the placement of example x- and y-folds in three dimensions in relation to the projection in area 1200. Folds correspond to areas of the projected image that already contain colour data, but have different depths than the similarly located colour data in area 1200.

Figure 13A:
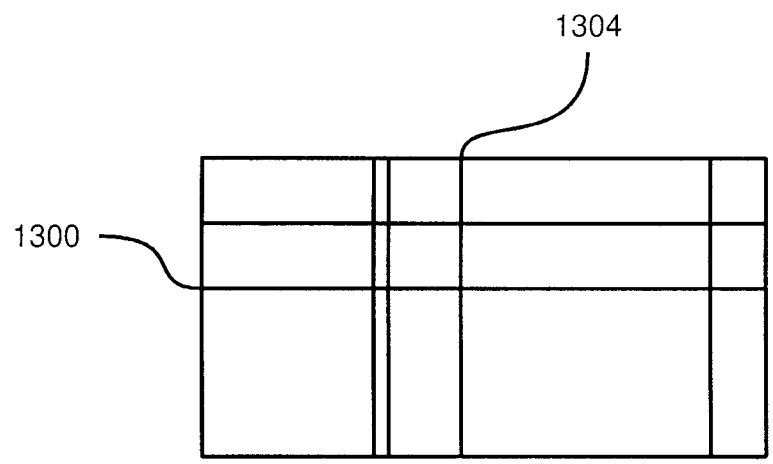
FIGS. 13A-13B depict example data structures for the projection of FIG. 12, according to a non-limiting embodiment.
Figure 13B:
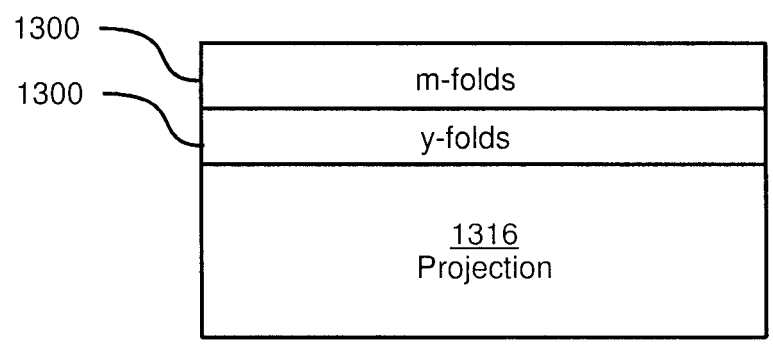

FIGS. 13A and 13B depict additional structures for the frames resulting from the performance of block 810. Any suitable projection method may be employed, and a variety of structures may be implemented that reserve certain areas for fold data. Examples of projection techniques that may be applied are equirectangular projection, cube mapping, octahedral environment mapping, sinusoidal projection, Hammer projection and Aitoff projection. In FIG. 13A, an arrangement is shown in which, rather than specific areas of the two-dimensional image being reserved for folds, y-folds 1300 and x-folds 1304 are inserted inline with the projected image data. m-folds may also be placed inline, or may simply be omitted.

In FIG. 13B, another example implementation is shown including m-folds 1308 and y-folds 1312 both in regions above projection area 1316. In this implementation, x-folds may be omitted. This implementation may be desirable if, for example, the width of the projected image is difficult to accommodate.

Figure 14A:
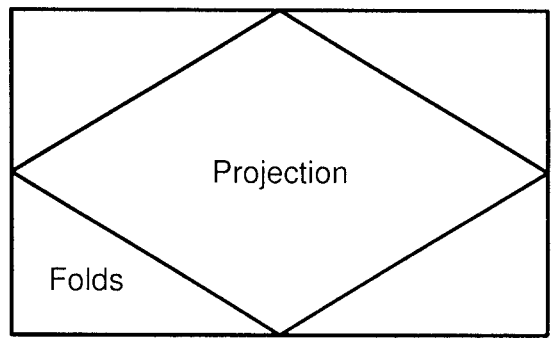
FIGS. 14A-14C depicts additional example data structures for the projection of FIG. 12, according to a non-limiting embodiment.

Other projection models and two-dimensional image structures are also contemplated. For example, turning to FIGS. 14A-14C, modified versions of equirectangular projection is displayed. As will be apparent to those skilled in the art, conventional equirectangular projection oversamples at the bottom and top of the image (due to the expansion of the point cloud's "poles" to the width of the projection). To remove the inefficiency introduced by such oversampling, developer device 28 can implement a modified equirectangular projection in which the width (horizontal axis) of the image is scaled by greater degrees from the center of the image towards the top and bottom. Sinusoidal or Hammer projection can be implemented to do this, or a simpler linear scaling can be implemented that results in a diamond shape, as seen in FIG. 14A.

Figure 14B:
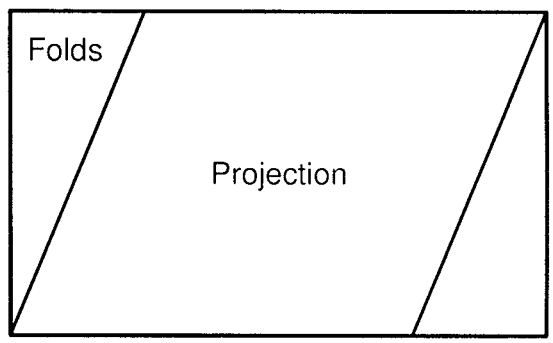
Figure 14C:
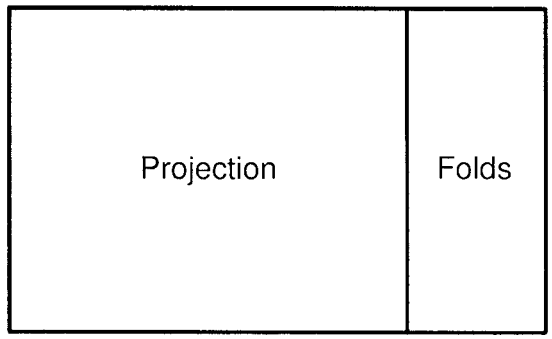

In the variant shown in FIG. 14B, the diamond-shaped projection has been rotated, consolidating the four fold areas into two. Further, in the variant shown in FIG. 14C, the projection shown in FIG. 14B has been skewed to consolidate the folds into a single area.

It is contemplated that projections (of any form) generated at block 810 can include references to palette images rather than colour data, where the determination at block 920 indicated that a particular location in the capture volume was subject to significantly different appearances based on viewpoint location. In some embodiments, such palette images can be stored in one or more additional frames (e.g. having the same size as the two-dimensional images mentioned above). In still other embodiments, the palette images may be stored in additional areas reserved separately from the projection and fold areas mentioned above.

Figure 15:
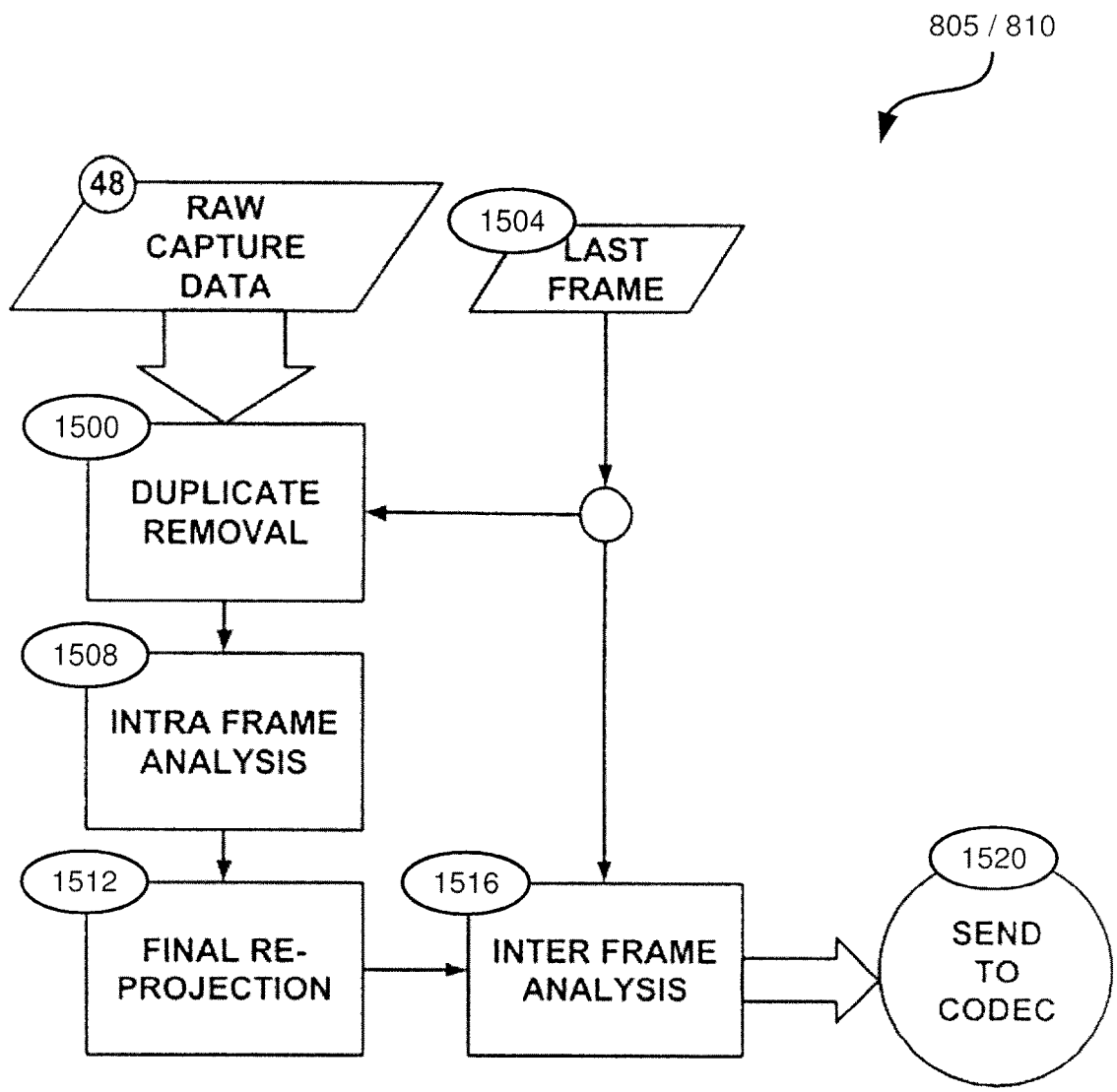
FIG. 15 depicts an example performance of blocks 805 and 810 of the method of FIG. 8, according to a non-limiting embodiment.

Referring now to FIG. 15, another implementation of blocks 805 and 810 is shown, for capturing point cloud data and generating two-dimensional images. In contrast to the processes described above in connection with FIGS. 9 and 10, the process shown in FIG. 15 contemplates performing additional compression by identifying blocks or clusters of points in the point cloud data, and storing references to such clusters in subsequent two-dimensional images, rather than colour and depth data for such clusters. Once the raw data 48 has been captured, it is sent through a process to streamline the data for compression and then transmission. The process starts with the removal of duplicates 1500 which can also include streamlined data from the last frame 1504 that the developer does not want repeated, for example, the static background.

As discussed above in connection with blocks 910 and 915, this duplicate removal 1500 contemplates that all points are converted to the same coordinate space, for example, spherical coordinates centered in the middle of the safe zone described in FIG. 5. Savings in the computation of these duplicates can be had by maintaining a list of used points for each capture device in a capture setup (see FIG. 5, for examples), as well as a central used point list stored in a sorted structure like an octree. Points may be considered "unused" if, in a previous frame, they were not incorporated into the co-registered point cloud (e.g. because the locations they represented were also represented by points from another node). The unused points from each node are monitored for a depth change, if there is none then the point remains unused, if there is a depth change, the pixel is added to the sorted structure and checked against existing points in use. This way only changed points of the captured data are checked for duplicates, which are then checked against a sorted structure reducing computation requirements.

After this duplicate removal, the data can go through an intra-frame analysis 1508 to identify the structure of the scene. This intra-frame analysis can include the identification of position grouped points (clusters) by conventional edge or blob-detection technologies, that can then be used for compression in the codec 56. The next step is a re-projection 1512 (an example of which was described above in connection with FIG. 10) of the points into their final viewing coordinate system, for example a spherical re-projection of the points centered around the ideal viewing position of the consumer. This re-projection may include the creation of folds, indexes for x and y (azimuthal and polar angles) in the equirectangular projection that will hold multiple lines of points. These index repetitions can be stored as an array of unsigned integers that the player can then use to navigate the new folded equirectangular projection, maintaining the same angle while on a folded index. The next step before sending data to the codec is the inter-frame analysis 1516 linking the clusters between frames which can allow for improved prediction based compression within the codec. The last step is the proper submission of the streamlined data to the codec for compression and packing 1520 (e.g. block 815 of method 800).

Figure 16:
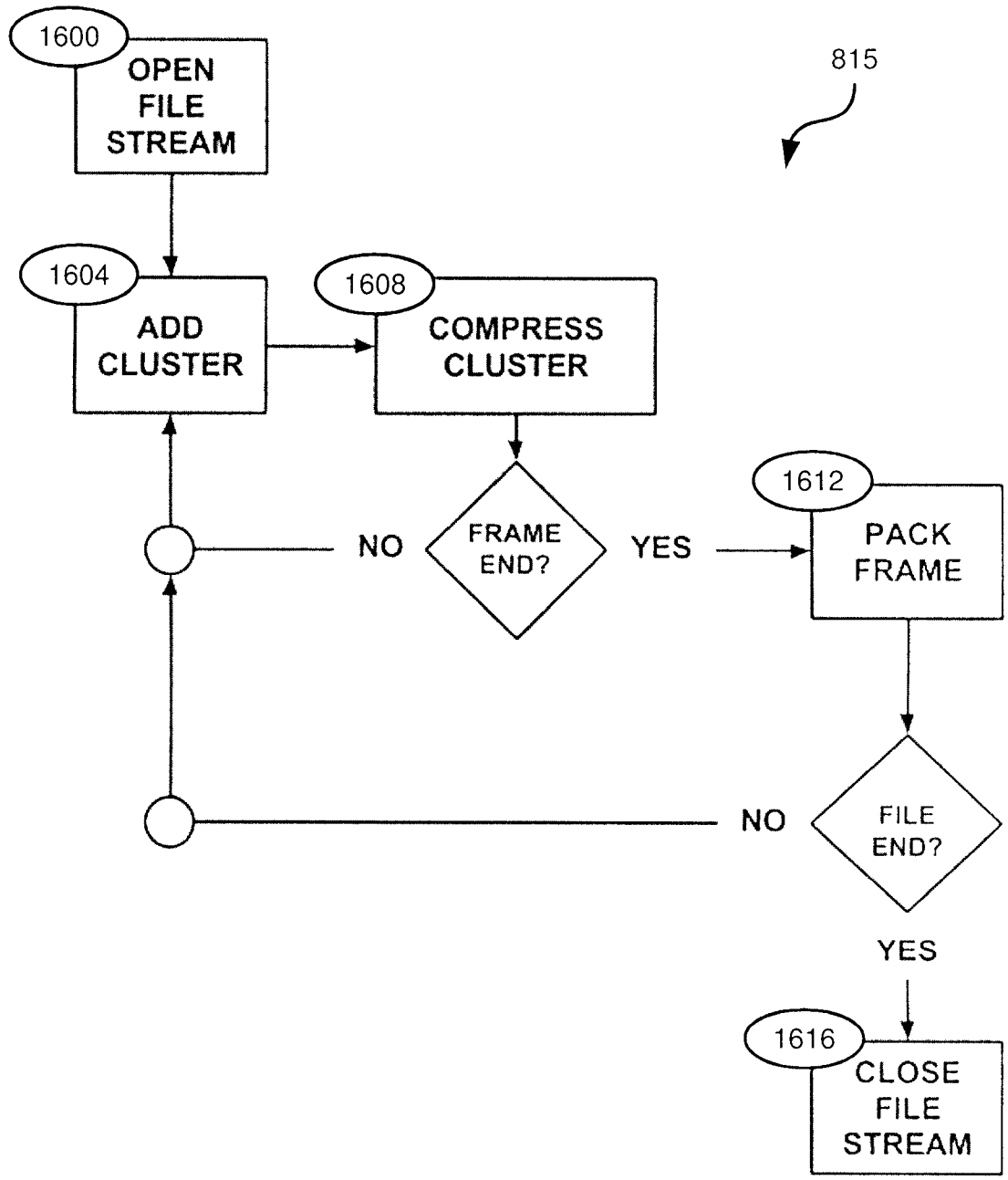
FIG. 16 depicts an example performance of block 815 of the method of FIG. 8, according to a non-limiting embodiment.

Having provided descriptions of various implementations for blocks 805 and 810, example implementations of block 815 will now be discussed. As mentioned earlier, the preparation of the two-dimensional images generated at block 810 is performed via execution of codec 56. Thus, a variety of preparations may be performed at block 815, depending on the codec employed. Referring to FIG. 16, an example implementation of block 815 is depicted. The process in FIG. 16, performed by developer device 28 via the execution of codec 56, assumes that a process similar to that shown in FIG. 15 was employed to perform blocks 805 and 810; specifically, FIG. 16 assumes that clusters have been identified in the original point cloud data and marked in the two-dimensional images.

The codec 56, as previously discussed on both the developer computer 28 and the consumer computer 64 in the hardware example in FIG. 1, has both a compression and decompression process. The first step of the compression process is the opening of a data or transport stream at block 1600. This will give the codec access to the stream until the completion of the streaming or the completion of the file. Next, a position based grouping of points that include color data is added to the codec (block 1604) from the editor or broadcaster and added to an internal structure representing the final file format.

This grouping of points is then compressed at block 1608 which can include using traditional image compression, such as the PNG (Portable Network Graphics) lossless compression, for the color data, while using any of a number of novel techniques for the position information. For compression, in one example, information is stored in spherical coordinates, with image information stored in either an equirectangular projection or a cube map (or any other suitable projection) and position information by adding a depth to the image data pixel position. Methods for position information compression can include: skipping any depth information related to transparent pixels; skipping depth data for pixels that are too far away from the end viewer to have any noticeable parallax, placing them instead at a default max distance; each cluster can store a single unsigned integer to represent the depth of the center of the cluster reducing each pixel depth to a byte offset from that initial short position.

The depth information can also provide insight for the improvement of existing motion picture based compression algorithms, such as MPEG-2, in novel ways removing artifacts and improving efficiency while creating new derivative techniques that makes use of depth information. With access to depth information, the ability to separate objects pixel by pixel that will move in blocks from their neighbors can be achieved because their neighbors have differing depths (are a part of different clusters), when normally they would need to be separated from their neighbors purely through inter scene algorithmic analysis which could end in errors (artifacts) or just be computationally inefficient.

After compressing the group of points, the adding and compression are repeated until the end of the frame is reached. At the end of each frame, a header is populated with meta data describing any additional instructions for reading or decompression and then all frame data is packed at block 1612 for writing. The frame is then written to the data or transport stream. Each frame repeats this process until all frames have been processed and the end of the file has been reached and the stream can then be closed at block 1616. The data or transport stream can then be transmitted to the consumer computer 36.

In another example implementation, a conventional codec such as H.264 (associated with the MPEG-4 standard) can be employed at block 815. Using conventional codecs permits the use of existing hardware-accelerated encoders and can thus improve the performance of system 10. In order to be able use existing codecs, such as H.264, developer device 28 is configured to generate a separate video stream for various types of data (e.g. colour, position or depth, normal, and the like). Some types of data, such as the colour data in projected two-dimensional images, can be compressed at block 815 using conventional image-compression techniques (including the motion-blocking techniques included in H.264). Such conventional techniques are less suited to compressing other types of data, such as depth data, however.

Figure 17:
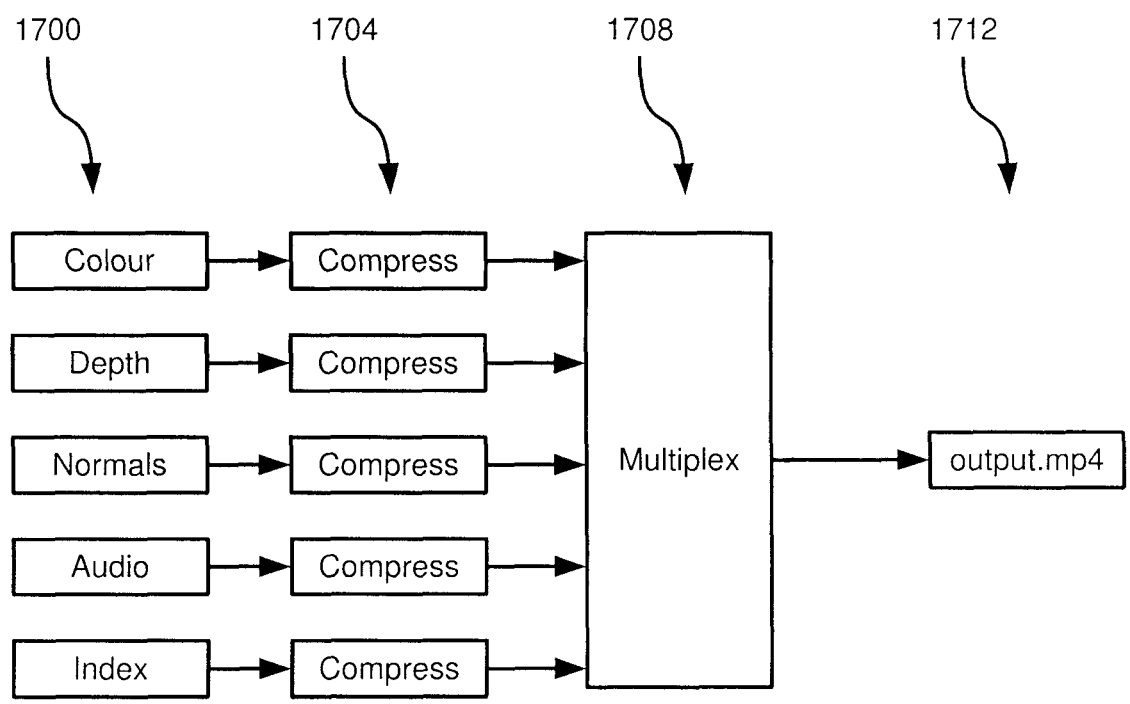
FIG. 17 depicts another example performance of block 815 of the method of FIG. 8, according to a non-limiting embodiment.

Referring to FIG. 17, an example implementation of block 815 is illustrated, making use of a codec such as H.264 and a file format that supports multiple video streams, such as the MP4 file format. Developer device 28 is configured to generate separate streams containing different types of data at step 1700. For example, a colour stream contains the projection and fold colour data discussed above, and shown in FIGS. 12, 13A, 13B and 14A-14C. A depth stream contains depth data corresponding to the colour data (e.g. a depth value for each pixel of colour data). The depth data can be contained in two-dimensional images similar in structure to the colour data.

The exact nature of the colour and depth data (as well as the streams mentioned below) are not particularly limited. In the present example, the colour data stream is stored as values in the YUV colour space (and is therefore converted from RGB, if necessary), as many conventional codecs support YUV rather than RGB colour spaces. For example, the NV12 format may be employed for colour data, which includes four luma (Y) samples for each pair of chrominance samples (U and V).

Developer device 28 can also store depth data in the YUV format in order to generate a video stream compatible with H.264 codecs. For instance, depth data may be stored according to the NV12 format by storing the depth for each pixel as a luma (Y) value, and ignoring the UV channel. Having zeros in the UV channel can cause the codec to skip the UV channel, thus reducing computational overhead. If the resolution of NV12 (8 bits per sample) is not great enough to accommodate all depth values, the depth values may be scaled (e.g. linearly or logarithmically). In other embodiments, the depth stream may be generated at a higher resolution than the colour stream, in order to provide additional resolution (e.g. multiple 8-bit samples define a single depth value) to define the depth values.

Further, a normals stream contains definitions of normals (lines perpendicular to the surfaces of objects in the capture volume) for at least a subset of the points defined in the two-dimensional images. The determination of normals is within the purview of those skilled in the art. An index stream may also be generated. The index stream can contain data linking, for example, the colour data with the depth data. In some examples, the index data can also identify associations between the projected colour data and the folded colour data. For example, some two-dimensional image data formats may not contain space to store a y-index for a y-fold. Instead, an index entry can be created that includes an identification of the y-fold's position within a frame (that is, the y-coordinate of the y-fold in the y-fold area), and a corresponding identification of the position within the projected data to which the fold corresponds. The index stream can also contain identifiers of points with associated palette images, as well as identifiers of the palette images themselves. An audio stream can also be generated, although the generation of audio data is not directly relevant to this discussion.

At step 1704, developer device 28 performs compression of each of the above-mentioned streams. Different compression algorithms can be applied to each stream. For example, the colour stream may be compressed using conventional lossy image compression techniques, while other streams (such as the depth and index streams) may be left uncompressed or compressed using lossless compression techniques. It is preferable to apply lossless compression to the depth, normals and index streams, while lossy compression on the colour stream may be preferable in some situations to reduce storage requirements and bandwidth consumption during transfer to consumer device 36.

At step 1708, developer device 28 multiplexes the various streams into an output file 1712. The output file can have a variety of formats. FIG. 18 depicts several example formats of output files. The file format 60 that is created on the developer computer 28 and then read by the consumer computer 36 in the hardware example in FIG. 1 is shown in an example schematic form. (The example is non-limiting and other examples will become apparent to the person skilled in the art upon review of this specification.) The format consists of a number of nested arrays of structures along with headers and trailers to manage the different types and variable sizes of the structures. The term cluster in this schematic refers to a grouping of points by position and their corresponding color and meta data. These clusters will correspond to objects or groups of objects in the scene the point cloud panorama is reconstructing.

The structures are nested as follows: the file 68 contains blocks corresponding to distinct frames 72, and each frame 72 holds an array of clusters; each cluster 80 can hold an array of motion blocks. The schematics represented by 76 and 80 are two alternative structures for a cluster. In 76 the image and depth data are represented in large blocks with little inter-frame compression applied. In 80 the use of motion blocks to represent the cluster allows for the image and depth data to be provided when necessary 84, but sometimes removed and replaced by multiple predictive instructions 88 that uses the last frame's data to construct this new frame. Examples of predictive instructions can be found in motion picture compression algorithms such as MPEG-4. The inclusion of position clustering and position data in general allows for increases in compression efficiency in file size and computation.

Figure 19:
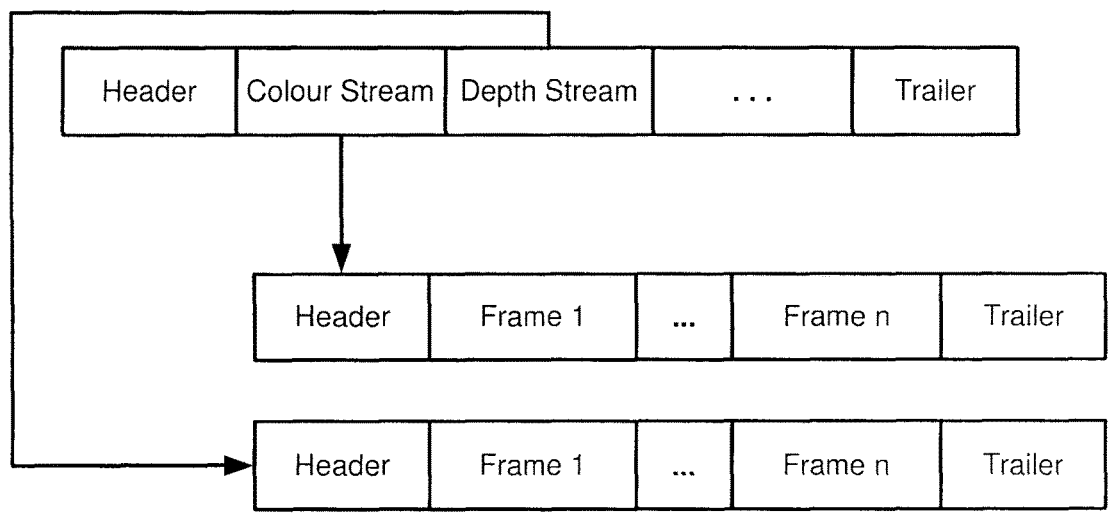
FIG. 19 depicts a further example of the file structure obtained via the performance of block 815 of the method of FIG. 8, according to a non-limiting embodiment.

Turning to FIG. 19, another example file format is shown, in which the use of clusters as shown in FIG. 18 is omitted. The example structure in FIG. 19 includes a header and a plurality of streams corresponding to the streams shown in FIG. 17. Each stream contains its own header and trailer data, as well as a plurality of frames containing the actual content (e.g. colour or depth data). The headers can identify compression algorithms employed, methods of projection employed, timestamps for use in synchronizing the various streams, and the like.

Various other file formats will also occur to those skilled in the art. In addition, features of the formats discussed above can be combined (e.g., clusters as shown in FIG. 18 can be employed in the multi-stream format shown in FIG. 19).

Referring again to FIG. 8, at block 820, consumer device 36 is configured to receive and decode the data prepared by developer device 28 as described above. Consumer device 36 is configured to decode the received data by executing codec 56 (that is, the same codec as was used to encode the data at developer device 28). Thus, referring to FIG. 20, in example embodiments employing MPEG4 files or files with similar structures, at step 2000 an input file is received (corresponding to the output file shown in FIG. 17). At step 2004, consumer device 36 is configured to demultiplex the various compressed streams of data in the input file. At step 2008, consumer device 36 is configured to decompress each stream according to the compression algorithms employed by developer device 28. Consumer device 36 can then store the resulting streams in memory 140 at step 2012. Also at step 2012, the streams can be synchronized with each other, for example using timestamps embedded in each stream.

Figure 21:
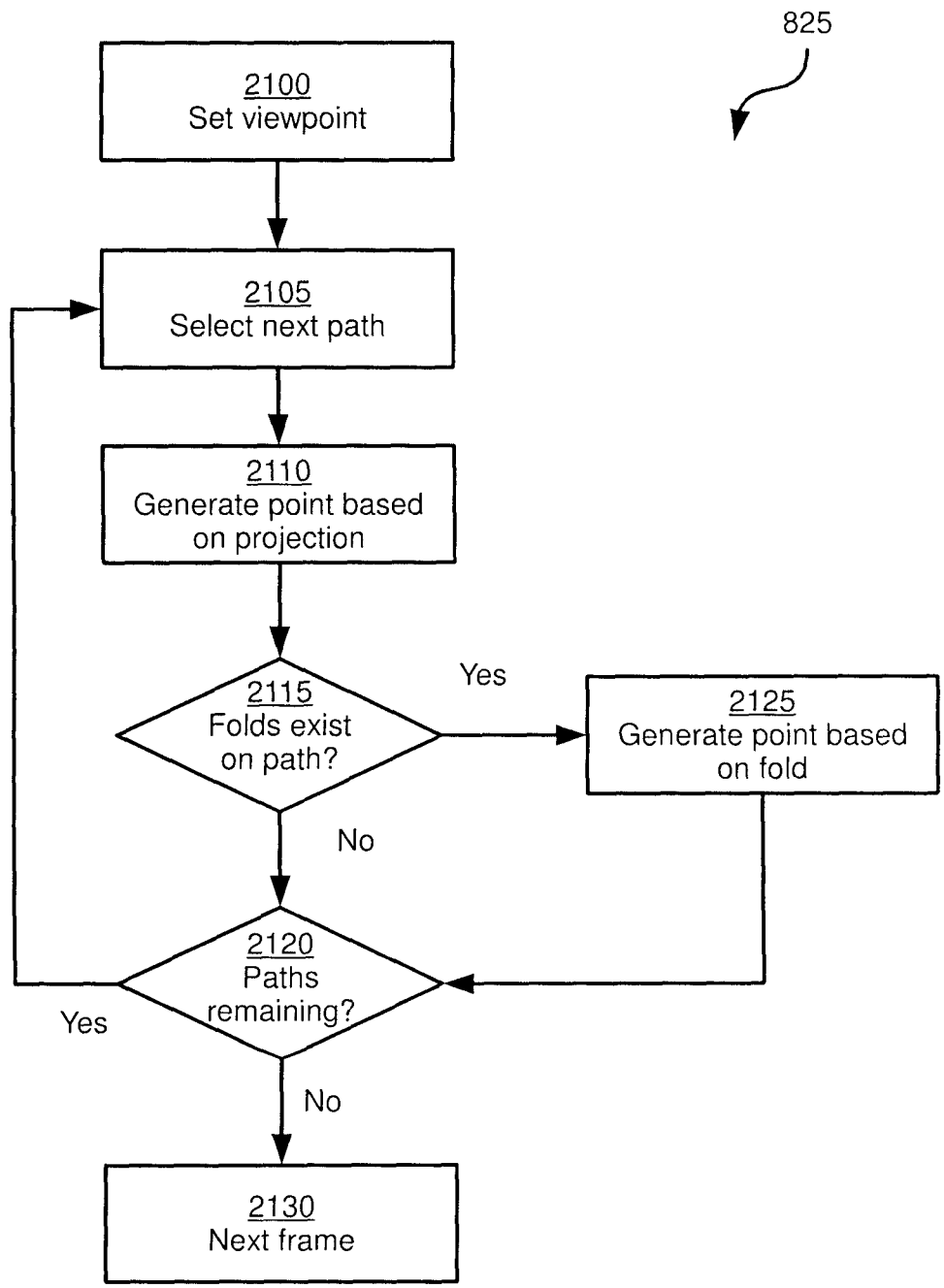
FIG. 21 depicts a method of performing block 825 of the method of FIG. 8, according to a non-limiting embodiment.

Following decoding at block 820, at block 825 consumer device 36 is configured to regenerate the portion of the original co-registered point cloud selected for projection by developer device 28. FIG. 21 depicts an example process for performing block 825 (for example, via execution of player 64). At block 2100, consumer device 36 is configured to set a viewpoint location. The viewpoint location is the same as the location used by developer device 28 at block 810 (and can be included, for example, in header data in the transferred file).

Having set the viewpoint, consumer device 36 is configured to select a path at block 2105, similar to the performance of block 1005 as discussed above. In brief, a first pair of coordinates in the two-dimensional image containing projected colour data is selected. At block 2110, consumer device 36 generates a first point in the regenerated cloud based on the projected colour data and accompanying depth data (retrieved, for example, by consulting the index stream). The creation of a cloud point can include converting the projected x-y coordinates of the selected path to spherical coordinates, and associating the colour data at the selected x-y coordinates with those spherical coordinates (or, if a reference to a palette is included instead of colour data, associating the palette reference with the spherical coordinates).

At block 2115, consumer device 36 is configured to determine whether any folds exist that correspond to the current selected path (that is, the currently selected x and y coordinates of the two-dimensional projection). If the determination is negative, then processing moves on to the remaining paths at block 2120. If the determination is affirmative, however, then another point (or several, if a linear fold such as a y-fold or an x-fold is present) is created in the cloud at block 2125 based on the colour data contained in the fold region of the two-dimensional image and the associated depth data.

Figure 22:
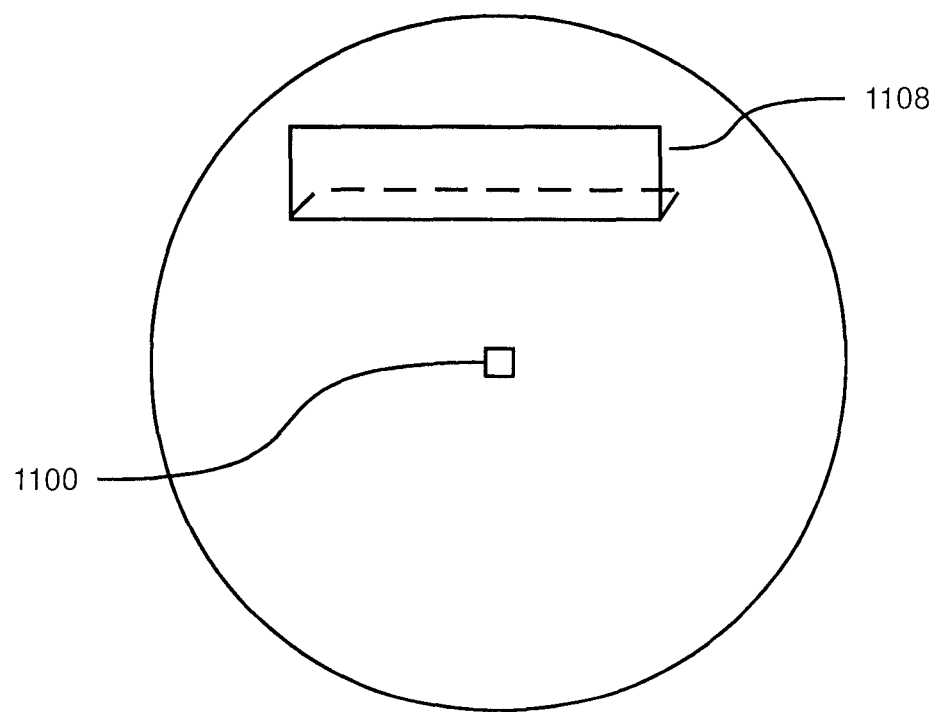
FIG. 22 depicts a point cloud generated through the performance of block 825 of the method of FIG. 8, according to a non-limiting embodiment.

When all paths have been processed (that is, when the entirety of the projected image has been processed), consumer device 36 proceeds to block 2130, and repeats the above process for the remaining frames of the received file. Referring now to FIG. 22, a regenerated version of the point cloud shown in FIG. 11 is depicted. As seen in FIG. 22, the entirety of object 1108 is not present in the regenerated point cloud. Instead, only the bottom and front surfaces are present, as the remaining surfaces were determined by developer device 28 to be outside the expected range of motion of viewpoint 1100.

FIG. 23 depicts another example implementation of decompression and point cloud regeneration (blocks 820 and 825) at consumer device 36, in which clusters were detected in the original point cloud, as discussed above. Once the file (also referred to herein as a data or transport stream) reaches the consumer computer 36 in the hardware example from FIG. 1, the file or stream can be opened 156 for reading. This step also includes the reading of the file header data for the initial setup of the player. The following steps in FIG. 23 are an example of how a player can use the codec to decompress and then display the motion point cloud panorama.

Once the player 64 has been initialized with the header data, the player 64 then uses the codec 56 to step through the nested structure of the file. First a frame 72 is loaded into memory at block 160. The player 64 then decompresses 164 the first cluster of frame 72 into memory. If the cluster is not linked to a cluster from the last frame, a new point cloud is created 168 by the player to represent this new cluster. The player then iterates through the point cloud updating each point's color and depth 172 checking for x and y folds before incrementing the spherical coordinates (x 176 representing the azimuthal angle and y 180 representing the polar angle). In this case the fold is represented by an array of unsigned integers for both x and y which identify indexes that the player should not increment x or y respectively. This allows for pixels to be placed behind or in front of one another in spherical coordinate space while maintaining a single image for transmitting the image data. The above process is repeated for the remaining clusters and frames.

Once all points have been updated in the regenerated cloud the player 64 can render the data to the view tracked display 40. An example of this rendering process that uses conventional 3D graphics engines includes the creation of 3D meshes and texturing the meshes using UV mapping. In other examples, conventional techniques for rendering point clouds, such as use of points as primitives or splatting, can also be implemented instead of vertex and texture-based rendering.

In general, to render each frame (that is, each regenerated point cloud), consumer device 36 is configured to receive positional data from view tracked display 40 indicating the simulated position of the viewer within the capture volume and the direction in which the viewer is looking. Having received positional information, consumer device 36 is configured to place a virtual viewpoint (also referred to as a virtual camera) in the regenerated point cloud at the location corresponding to the above-mentioned positional data. When view tracked display 40 includes two displays, a virtual camera would be placed in the virtually relative position of each eye of the viewer (properly separated for interpupillary distance and placed according to orientation and position tracking data provided by the view tracked display 40) at the center of point cloud panorama. Each virtual eye camera then renders to the appropriate part of the view tracked display to project an image for the viewer's eye. Once the player has displayed all frames, the file or stream can be closed (as shown at block 184 in FIG. 23).

When palette images are employed, during the rendering process consumer device 36 can be configured to determine, from the palette image, which of a plurality of possible colours to apply to a point in the regenerated point cloud. Consumer device 36 is configured to determine the difference between (i) a path from the viewpoint position to the point being rendered and (ii) a path from the center of the point cloud to the point being rendered. The nature of the difference determined is not particularly limited; for example, a distance from the viewpoint and the center can be determined, or an angle between the paths can be determined. Based on the difference, a distance from the center of the palette image is determined, and the colour at that distance is selected for rendering the point.

In some embodiments, an optimized form of rendering process can be employed, in which only a portion of each two-dimensional frame is converted into a regenerated point cloud at block 825. For example, consumer device 36 can, based on a previous known viewer position and direction received from view tracking device 40, determine a maximum predicted range of motion for the viewer for the next frame (e.g. the user is unlikely to move by a distance greater than the maximum prediction). Consumer device 36 can then select a portion of the next frame for point cloud regeneration. Referring to FIG. 24, an example frame is shown, in which only an image subset 2400, a y-fold subset 2404, and an x-fold subset 2408 are used at block 825 (m-folds, if present, are always used given the potentially disparate locations of individual m-fold pixels).

While the foregoing discusses certain embodiments, those skilled in the art will appreciate that variations, combinations and subsets are contemplated. For example, the foregoing is applicable to both stills as well as moving pictures. As a further example, in some embodiments the performance of blocks 810 and 815, as well as blocks 820 and 825, can be omitted. That is, in some embodiments, point cloud data can be captured (e.g. as shown in FIG. 9) and transmitted directly, without the above-mentioned projection and preparation processes, to consumer device 36 for rendering.

In further variations, developer device 28 can perform at least a portion of the functionality described above in connection with consumer device 36. For example, consumer device 36 can transmit control data to developer device 28 via network 112, such as positional data indicating the location and direction of the virtual viewpoint determined by view tracking device 40. Developer device 28 can be configured, in response to receiving the control data, to generate projections (block 810) based on the received control data. Such projections can be generated and supplied to consumer device 36 substantially in real time (although the use of folds, as described above, accommodate latency between the receipt of control data by developer device 28 and the receipt of corresponding projections at consumer device 36—changes in the location of the viewpoint of view tracking device 40 in between the transmission of the most recent control data and the receipt of corresponding projections can be accomodated by fold data).

In other examples, developer device 28 can generate final renders (for presentation on view tracking device 40) from the original co-registered point cloud upon receipt of positional data from consumer device 36. In other words, developer device 28 can perform block 805 and a portion of block 830, sending only a rendered video stream to consumer device 36 based on received positional data, rather than sending projections from which consumer device 36 can reconstruct a point cloud and render multimedia. In these examples, consumer device 36 need only present the rendered frames received from developer device 28, and need not perform block 825 (some decoding may be necessary, depending on the compression applied to the rendered frames by developer device 28).

In still other examples, developer device 28, in response to the above-mentioned control data, can send point cloud data directly to consumer device 36 rather than projections or rendered video frames. For instance, developer device 28 may select a portion of the point cloud data to send to consumer device 36 based on the control data.

The use of the term "control data" above includes not only positional data relating to the position and direction of the virtual viewpoint provided by view tracking display 40, but can also include input data in the form of commands from a keyboard or other input device (e.g. game controller) at consumer device 36, user gestures detected by consumer device 36, and the like.

In still further examples, consumer device 36 can navigate between separate multimedia data files or streams (e.g. depicting separate capture volumes) in response to receiving the above-mentioned control data. Such control data can also be employed to navigate (e.g. fast forward, rewind and the like) within a given file or stream (e.g. depicting a single capture volume).

We claim:

1. A method of generating virtual reality multimedia at a developer computing device having a processor interconnected with a memory, comprising:
    capturing, at the processor, a point cloud representing a scene, the point cloud data including colour data and depth data for each of a plurality of points corresponding to locations in the capture volume; wherein capturing the point cloud includes:
        receiving a plurality of point cloud sets at the processor from a respective plurality of capture nodes;
        registering each of the plurality of point cloud sets to a common frame of reference; and
        replacing a plurality of overlapping points, representing a common location in the capture volume, with a single point;
    generating, at the processor, a two-dimensional projection of a selected portion of the point cloud including selected ones of the plurality of points, the projection including, for each selected point, (i) a pixel containing the colour data from the selected point, and (ii) a compressed representation of the depth data from the selected point; and
    storing the pixels containing the colour data for each selected point, and the compressed representations of the depth data for each selected point, in the memory.

2. The method of claim 1, further comprising:
    transmitting the two-dimensional projection to a consumer computing device for playback.

3. The method of claim 1, further comprising:
    capturing a plurality of point clouds representing the scene over a period of time, and, for each point cloud, generating a two-dimensional projection of a selected portion of the point cloud.

4. The method of claim 1, wherein generating the two-dimensional projection comprises:
    generating a first two-dimensional array containing the colour data; and
    generating a second two-dimensional array containing the depth data.

5. The method of claim 4, wherein storing the two-dimensional projection in the memory further comprises:
    at the processor, compressing the first two-dimensional array; and
    combining the first two-dimensional array and the second two-dimensional array in a digital video file.

6. The method of claim 1, wherein each capture node comprises a camera and a depth sensor.

7. The method of claim 1, wherein generating the two-dimensional projection further comprises:
    selecting a viewpoint within the point cloud;
    for each of a plurality of paths originating at the viewpoint:
        placing the first point intersected by the path into a projection area of the two-dimensional projection;
        determining whether the path intersects any other points; and
        when the determination is affirmative, placing at least one of the other points into a folds area of the two-dimensional projection.

8. The method of claim 7, further comprising:
    selecting the at least one other point for placement into the folds area by determining whether the at least one other point would be visible from within a maximum predicted range of motion of the viewpoint.

9. The method of claim 7, further comprising: generating an index linking the at least one other point in the folds area to the first point in the projection area.

10. A developer computing device, comprising:
    a memory; and
    a processor interconnected with the memory, and configured to generate virtual reality multimedia by:
        capturing a point cloud representing a scene, the point cloud data including colour data and depth data for each of a plurality of points corresponding to locations in the capture volume; wherein the processor is configured to captured the point cloud by:
            receiving a plurality of point cloud sets at the processor from a respective plurality of capture nodes;
            registering each of the plurality of point cloud sets to a common frame of reference; and
            replacing a plurality of overlapping points, representing a common location in the capture volume, with a single point;
        generating a two-dimensional projection of a selected portion of the point cloud including selected ones of the plurality of points, the projection including, for each selected point, (i) a pixel containing the colour data from the selected point, and (ii) a compressed representation of the depth data from the selected point; and
        storing the pixels containing the colour data for each selected point, and the compressed representations of the depth data for each selected point, in the memory.

11. A method of virtual reality multimedia playback in a consumer computing device having a processor interconnected with a memory and a display, comprising:
    receiving projection data defining a two-dimensional projection of a selected portion of a point cloud including selected ones of a plurality of points of the point cloud, the data including pixels containing (i) colour data for each selected point, and (ii) compressed representations of depth data for each selected point;
    decompressing the projection;
    regenerating the selected portion of the point cloud from the projection data by:
        setting a viewpoint within the point cloud;
        for each of a plurality of coordinate pairs in the projection:
        identifying a position in the point cloud corresponding to the coordinate pair, based on the coordinate pair and the depth data;
        identifying whether a further position in the point cloud corresponds to the coordinate pair;
        when a further position in the point cloud corresponds to the coordinate pair, assigning a colour of a fold in the projection having different coordinates than the coordinate pair to the further position; and
        otherwise, assigning a colour associated with the coordinate pair to the position; and
    rendering the selected portion of the point cloud on the display.

12. The method of claim 11, wherein rendering the point cloud on the display comprises:
    receiving, at the processor, a viewpoint position;
    placing a virtual camera in the point cloud at the viewpoint position; and
    rendering the point cloud from the perspective of the virtual camera.

13. The method of claim 12, wherein rendering the point cloud on the display further comprises repeating the receiving of a viewpoint position, placement of a virtual camera and rendering of the point cloud for a pair of displays.

14. A consumer computing device, comprising:
   a memory;
   a display; and
   a processor interconnected with the memory and the display, and configured to play virtual reality multimedia by:
      receiving projection data defining a two-dimensional projection of a selected portion of a point cloud including selected ones of a plurality of points of the point cloud, the data including pixels containing (i) colour data for each selected point, and (ii) compressed representations of depth data for each selected point;
      regenerating the selected portion of the point cloud from the projection data by:
         setting a viewpoint within the point cloud;
         for each of a plurality of coordinate pairs in the projection:
            identifying a position in the point cloud corresponding to the coordinate pair, based on the coordinate pair and the depth data;
            identifying whether a further position in the point cloud corresponds to the coordinate pair;
            when a further position in the point cloud corresponds to the coordinate pair, assigning a colour of a fold in the projection having different coordinates than the coordinate pair to the further position; and
            otherwise, assigning a colour associated with the coordinate pair to the position; and
      rendering the selected portion of the point cloud on the display.

15. The consumer computing device of claim 14, wherein the display comprises a head-mounted view tracked display.

16. A system for generation and playback of virtual reality multimedia, comprising:
   a developer computing device comprising:
      a first memory; and
      a first processor interconnected with the first memory, and configured to generate virtual reality multimedia by:
         capturing a point cloud representing a scene, the point cloud data including colour data and depth data for each of a plurality of points corresponding to locations in a capture volume; wherein the processor is configured to capture the point cloud by:
            receiving a plurality of point cloud sets at the processor from a respective plurality of capture nodes;
            registering each of the plurality of point cloud sets to a common frame of reference; and
            replacing a plurality of overlapping points, representing a common location in the capture volume, with a single point;
         generating a two-dimensional projection of a selected portion of the point cloud including selected ones of the plurality of points, the projection including, for each selected point, (i) a pixel containing the colour data from the selected point, and (ii) a compressed representation of the depth data from the selected point; and
         storing the pixels containing the colour data for each selected point, and the compressed representations of the depth data for each selected point, in the memory;
   a consumer computing device comprising:
      a second memory;
      a display; and
      a second processor interconnected with the second memory and the display, and configured to play virtual reality multimedia by:
         receiving the two-dimensional projection of the selected portion of the point cloud;
         regenerating the selected portion of the point cloud from the two-dimensional projection by:
            setting a viewpoint within the point cloud;
            for each of a plurality of coordinate pairs in the projection:
               identifying a position in the point cloud corresponding to the coordinate pair, based on the coordinate pair and the depth data;
               identifying whether a further position in the point cloud corresponds to the coordinate pair;
               when a further position in the point cloud corresponds to the coordinate pair, assigning a colour of a fold in the projection having different coordinates than the coordinate pair to the further position; and
               otherwise, assigning a colour associated with the coordinate pair to the position; and
         rendering the selected portion of the point cloud on the display; and
   a capture setup connected to the developer computing device for capturing the point cloud.

* * * * *